United States Patent
Schloter

(10) Patent No.: US 9,600,584 B2
(45) Date of Patent: *Mar. 21, 2017

(54) SCALABLE VISUAL SEARCH SYSTEM SIMPLIFYING ACCESS TO NETWORK AND DEVICE FUNCTIONALITY

(71) Applicant: Nokia Technologies Oy, Espoo (FI)

(72) Inventor: Philipp Schloter, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,312

(22) Filed: Aug. 21, 2014

(65) Prior Publication Data

US 2014/0365472 A1 Dec. 11, 2014

Related U.S. Application Data

(63) Continuation of application No. 11/592,460, filed on Nov. 4, 2006, now Pat. No. 8,849,821.

(60) Provisional application No. 60/733,941, filed on Nov. 4, 2005.

(51) Int. Cl.
*G06F 17/30* (2006.01)
*H04L 29/06* (2006.01)
*H04W 4/16* (2009.01)
*H04W 4/02* (2009.01)

(52) U.S. Cl.
CPC .. *G06F 17/30867* (2013.01); *G06F 17/30864* (2013.01); *H04L 29/06027* (2013.01); *H04L 65/4084* (2013.01); *H04W 4/16* (2013.01); *H04W 4/02* (2013.01)

(58) Field of Classification Search
CPC ......... G06F 17/30864; G06F 17/30867; G06F 17/3087
USPC ....................................................... 707/736
See application file for complete search history.

(56) References Cited

U.S. PATENT DOCUMENTS

| | | | |
|---|---|---|---|
| 5,908,465 A | 6/1999 | Ito et al. | |
| 5,991,739 A | 11/1999 | Cupps et al. | |
| 6,081,629 A | 6/2000 | Browning | |
| 6,208,353 B1 | 3/2001 | Ayer et al. | |
| 6,476,830 B1 | 11/2002 | Farmer et al. | |
| 6,480,840 B2 | 11/2002 | Zhu et al. | |
| 6,804,606 B2 | 10/2004 | Jones | |
| 6,948,135 B1 * | 9/2005 | Ruthfield et al. | 715/854 |
| 6,988,990 B2 | 1/2006 | Pan et al. | |
| 7,093,012 B2 | 8/2006 | Olstad et al. | |

(Continued)

FOREIGN PATENT DOCUMENTS

| | | |
|---|---|---|
| EP | 1315102 A2 | 5/2003 |
| EP | 1473634 A2 | 11/2004 |

(Continued)

OTHER PUBLICATIONS

Corrected European Search Report for related European Patent Application No. 12 17 1396 dated Nov. 20, 2012, pp. 1-4.

(Continued)

*Primary Examiner* — Cam-Y Truong
(74) *Attorney, Agent, or Firm* — Ditthavong & Steiner, P.C.

(57) ABSTRACT

In one embodiment, an indication of information desired by a user is received, and a list of candidates for the desired information is provided for presentation on a mobile device of the user.

20 Claims, 19 Drawing Sheets

(56) References Cited

U.S. PATENT DOCUMENTS

| | | | |
|---|---|---|---|
| 7,154,538 B1* | 12/2006 | Fukasawa et al. | 348/211.3 |
| 7,200,597 B1 | 4/2007 | Grizzard | |
| 7,203,674 B2 | 4/2007 | Cohen | |
| 7,283,992 B2 | 10/2007 | Liu et al. | |
| 7,421,724 B2 | 9/2008 | Klosterman et al. | |
| 7,818,336 B1 | 10/2010 | Amidon et al. | |
| 8,375,286 B2* | 2/2013 | Allen et al. | 715/208 |
| 2001/0014891 A1* | 8/2001 | Hoffert et al. | 707/104.1 |
| 2001/0027475 A1* | 10/2001 | Givol et al. | 709/204 |
| 2002/0082901 A1 | 6/2002 | Dunning et al. | |
| 2002/0087263 A1 | 7/2002 | Wiener | |
| 2002/0113757 A1 | 8/2002 | Hoisko | |
| 2002/0124264 A1 | 9/2002 | Kikinis | |
| 2002/0151283 A1* | 10/2002 | Pallakoff | 455/90 |
| 2002/0152267 A1 | 10/2002 | Lennon | |
| 2002/0194351 A1* | 12/2002 | Nishimura et al. | 709/229 |
| 2003/0036848 A1* | 2/2003 | Sheha et al. | 701/209 |
| 2003/0040866 A1 | 2/2003 | Kawakami | |
| 2003/0063770 A1* | 4/2003 | Svendsen et al. | 382/100 |
| 2003/0065661 A1 | 4/2003 | Chang et al. | |
| 2003/0156208 A1 | 8/2003 | Obradovich | |
| 2003/0191737 A1 | 10/2003 | Steele et al. | |
| 2003/0229537 A1 | 12/2003 | Dunning et al. | |
| 2004/0054659 A1 | 3/2004 | McIntyre | |
| 2004/0097190 A1 | 5/2004 | Durrant et al. | |
| 2004/0143569 A1 | 7/2004 | Gross et al. | |
| 2004/0148275 A1 | 7/2004 | Achlioptas | |
| 2004/0168052 A1 | 8/2004 | Clisham et al. | |
| 2004/0189816 A1 | 9/2004 | Nakazawa et al. | |
| 2004/0208372 A1* | 10/2004 | Boncyk et al. | 382/181 |
| 2004/0214619 A1* | 10/2004 | Chiang | 455/575.3 |
| 2004/0215523 A1 | 10/2004 | Wulff et al. | |
| 2004/0246342 A1 | 12/2004 | Kim et al. | |
| 2004/0267700 A1 | 12/2004 | Dumais et al. | |
| 2005/0027705 A1 | 2/2005 | Sadri et al. | |
| 2005/0030404 A1 | 2/2005 | Takahashi et al. | |
| 2005/0149423 A1 | 7/2005 | Roseme et al. | |
| 2005/0171832 A1 | 8/2005 | Hull et al. | |
| 2005/0182784 A1* | 8/2005 | Trappen et al. | 707/102 |
| 2005/0185060 A1 | 8/2005 | Neven, Sr. | |
| 2005/0221821 A1 | 10/2005 | Sokola et al. | |
| 2005/0240572 A1* | 10/2005 | Sung et al. | 707/3 |
| 2005/0246324 A1 | 11/2005 | Paalasmaa et al. | |
| 2006/0002607 A1 | 1/2006 | Boncyk et al. | |
| 2006/0012677 A1 | 1/2006 | Neven, Sr. et al. | |
| 2006/0012699 A1* | 1/2006 | Miki | 348/333.01 |
| 2006/0033809 A1 | 2/2006 | Farley | |
| 2006/0036565 A1 | 2/2006 | Bruecken | |
| 2006/0064732 A1* | 3/2006 | Hirosawa et al. | 725/105 |
| 2006/0069503 A1 | 3/2006 | Suomela et al. | |
| 2006/0069577 A1 | 3/2006 | Schmitt et al. | |
| 2006/0069674 A1 | 3/2006 | Palmon et al. | |
| 2006/0085477 A1* | 4/2006 | Phillips et al. | 707/104.1 |
| 2006/0089792 A1 | 4/2006 | Manber et al. | |
| 2006/0143016 A1 | 6/2006 | Jones et al. | |
| 2006/0174203 A1 | 8/2006 | Jung et al. | |
| 2006/0206379 A1 | 9/2006 | Rosenberg | |
| 2006/0248061 A1 | 11/2006 | Kulakow et al. | |
| 2006/0253226 A1 | 11/2006 | Mendelson | |
| 2007/0055439 A1 | 3/2007 | Denker et al. | |
| 2007/0162942 A1 | 7/2007 | Hamynon et al. | |
| 2007/0283236 A1 | 12/2007 | Sugiura et al. | |
| 2008/0104067 A1 | 5/2008 | Thorson et al. | |
| 2008/0133392 A1 | 6/2008 | Jung et al. | |
| 2008/0221862 A1 | 9/2008 | Guo et al. | |

FOREIGN PATENT DOCUMENTS

| | | |
|---|---|---|
| WO | 03/032005 A2 | 4/2003 |
| WO | 2005/103980 A2 | 11/2005 |
| WO | 2006/120286 A2 | 11/2006 |

OTHER PUBLICATIONS

European Search Report for related European Patent Application No. 12 17 1396 dated Nov. 20, 2012, pp. 1-4.

Supplementary European Search Report for related European Patent Application No. 07 82 5120 dated Nov. 22, 2012, pp. 1-8.

Chinese office action for CN application No. 200780038578.4 dated Sep. 9, 2010, pp. 1-12.

Evaluating Associativity in CPU Caches, Hill et al., IEEE Transactions on Computers, vol. 38, No. 12, Dec. 1989, pp. 1612-1630.

Korean Office action for corresponding KR App. 10-2008-7013528 dated Oct. 29, 2010, pp. 1-6.

Office action for related U.S. Appl. No. 11/855,419 dated Oct. 14, 2010, pp. 1-70.

Profile based caching to enhance data availability in push/pull mobile environment, Kambalakatta et al., Proc. of the first annual intl conf on mobile and ubiquitous systems: networking and services, 2004, pp. 1-10.

Final Office Action for related U.S. Appl. No. 11/855,409 dated Jul. 8, 2011, pp. 1-70.

Office Action for related U.S. Appl. No. 11/855,419 dated Sep. 20, 2011, pp. 1-85.

Final Office Action for related U.S. Appl. No. 11/855,430 dated Feb. 4, 2013, pp. 1-36.

Chinese Office Action for related Chinese Patent Application No. 200780041291.7 dated Jan. 18, 2012, pp. 1-8.

Final Rejection for related U.S. Appl. No. 11/855,419 dated Mar. 1, 2012, pp. 1-34.

Final Rejection for related U.S. Appl. No. 11/855,430 dated Mar. 7, 2012, pp. 1-43.

Final Rejection for related U.S. Appl. No. 11/952,452 dated Feb. 15, 2012, pp. 1-29.

Office Action for related U.S. Appl. No. 11/855,430, dated Oct. 23, 2012, pp. 1-68.

Office Action for related U.S. Appl. No. 11/855,419 dated Jun. 18, 2012, pp. 1-51.

Office Action for related U.S. Appl. No. 11/952,452 dated Oct. 19, 2011, pp. 1-27.

Office Action for related U.S. Appl. No. 11/855,430 dated Oct. 14, 2011, pp. 1-74.

Office Action for related U.S. Appl. No. 12/982,234 dated Oct. 19, 2011, pp. 1-53.

Chinese Office action for corresponding CN application No. 200780041291.7 dated Jan. 26, 2011, pp. 1-6.

Office action for related U.S. Appl. No. 11/855,409 dated Jan. 19, 2011, pp. 1-53.

Office action for related U.S. Appl. No. 11/952,452 dated Feb. 4, 2011, pp. 1-13.

Chinese Office action for corresponding CN application No. 200780042622.9 dated Dec. 21, 2010, pp. 1-11.

Public Applications of SpaceTag and Their Impacts, Tarumi et al., Digital Cities, Ishida et al. (Eds.), LNCS 1765, 2000, Springer-Verlag Berlin Heidelberg, pp. 350-363.

Korean Office Action for related KR Application No. 10-2008-7013528 dated Mar. 28, 2011, pp. 1-5.

Office Action for related U.S. Appl. No. 12/982,234 dated Mar. 29, 2011, pp. 1-57.

European Office action for corresponding EP App. No. 06837112.9-2201 dated Jun. 1, 2010, pp. 1.

Extended European Search Report for Corresponding EP App. No. 06837112.9-2201 dated Feb. 26, 2010, pp. 1-9.

Gold turns to Silver: Yellow Pages on CD-ROM, Desmarais, CD Rom Librarian, vol. 7, No. 3, pp. 21-27, Mar. 1, 1992.

Korean Office action for corresponding KR App. 10-2008-7013528 dated Apr. 30, 2010, pp. 1-10.

Mexican Office action for corresponding MX App. No. MX/a/2008/05857 dated May 26, 2010, pp. 1-6.

Yellow Pages on CD-ROM, A Survey of Three Contemporary Products, Waterman, CD ROM Professional, vol. 6, No. 5, pp. 62-69, Sep. 1, 1993.

* cited by examiner

SCALABLE VISUAL SEARCH SYSTEM SIMPLIFYING ACCESS TO NETWORK AND DEVICE FUNCTIONALITY

RELATED APPLICATIONS

This application is related to and is a continuation of U.S. application Ser. No. 11/592,460, filed Nov. 4, 2006, which claims the benefit of U.S. Provisional Patent application Ser. No. 60/733,941, filed Nov. 4, 2005, the content of both of which are hereby incorporated by reference in their entireties.

FIELD OF THE INVENTION

This invention relates generally to search systems, and more particularly to a visual search system simplifying access to network and device functionality.

BACKGROUND OF THE INVENTION

Currently, a personal computer (PC) provides the best form of information retrieval. However, access to PCs is limited and they are not widely owned. PC-based information retrieval tools typically require users to spend time walking to a desk or other area with a PC, activate a search engine, and type keywords describing a desired search. The information sought is often difficult to describe in keywords and search results may not always be exactly what one has been looking for. In addition, the information search itself can take a significant amount of time.

Mobile phones achieved much greater market penetration than the PC. Throughout the world, there are four times as many mobile phones as PCs, and people carry their mobile phones most of the day. However, the mobile phones are generally not being used as an information tool due to a difficult and limited user interface, the small keypad for typing, and a lack of awareness about websites designed for mobile access.

There have been several approaches to making mobile phones easier to use. One approach uses an automatic dictionary for typing text with number keypad. However, typing web-links or longer text takes a significant amount of time even with the dictionary, and typing text that does not consist of dictionary words takes even longer.

Another existing approach uses voice recognition to dial phone numbers or activate applications. This approach provides poor quality due to interference and background noise (e.g., wind, chatter, music, etc.), and saying words or their spelling can take much longer than typing text on a keyboard. In addition, voice can be intrusive and interrupt other conversations around the user and compromise confidentiality. Furthermore, constant talking strains people's vocal chords and can cause them to lose their ability to speak.

An approach that involves scanning of bar codes to obtain desired information can only provide information about objects that have a bar code on them. Extending the use of this approach requires placing bar codes on various objects, which can be time-consuming, expensive, awkward or even impossible.

Wireless pens that digitize handwriting require a flat surface to write, can be slow in transmitting data, and may have to be trained to a person's handwriting. In addition, the use of a wireless pen results in carrying an extra piece of equipment and usually requires special paper to work.

Foldable, portable keyboards for personal digital assistants (PDAs) and other mobile devices operate only when placed on a flat surface, and result in carrying an extra piece of equipment. Mini-projectors integrated into a mobile device that project a virtual keyboard in front of the device also require a flat surface to sit down. In addition, mini-projectors reduce battery life of mobile devices, and do not work with reflective surfaces.

Proximity-based information tags require the deployment of physical tags equipped, e.g. with Bluetooth, RFID, IR or any other mean of communicating with other entities in close proximity. In addition, proximity-based information tags require terminal devices to be equipped with the right sensors to interface with the tags, require maintenance as tags wear out or run out of battery, and cannot obtain information unless they are located in proximity of tag.

Traditional search engines require a user to describe the search in keywords, which can often be challenging and needs a good input method such as a PC-like keyboard to facilitate user input of text. In addition, the presentation of search results is often not well designed for mobile devices with smaller screens.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1A:
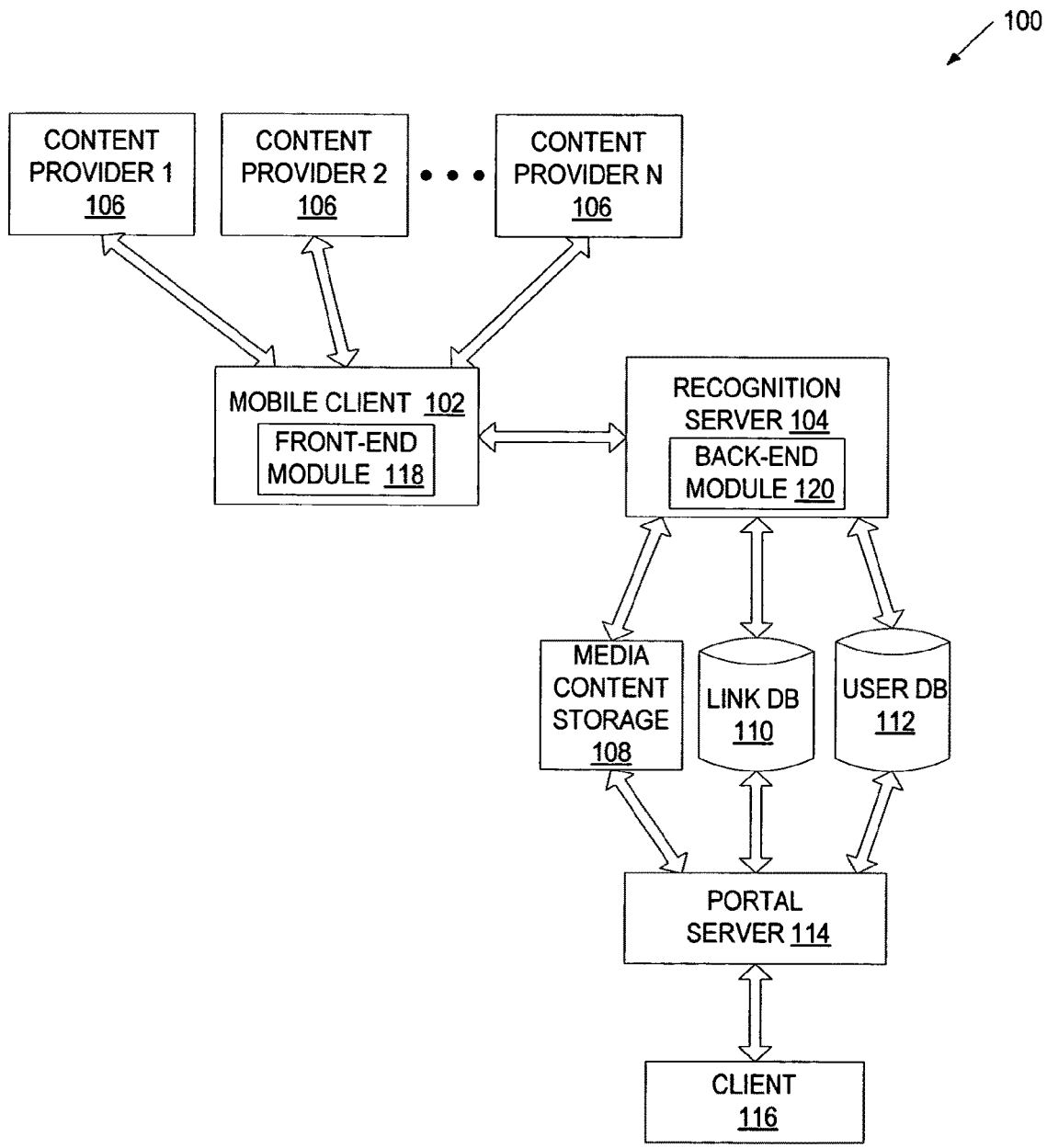
FIGS. 1A and 1B are block diagrams illustrating examples of two alternative system architectures in which embodiments of the invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Overview

Embodiments of the present invention disclose a system that receives an indication of information desired by a user, and generates a list of candidates for the desired information for presentation on a mobile device of the user. By way of example, the system may receive an indication in the form of a restaurant façade photo taken by a user of a camera phone, and generate a list of information items potentially desired by the user for presentation on the display of the user's phone. These information items may include, for example, a web site providing reviews of the restaurant, a phone number of the restaurant, a link to the map of the restaurant area, etc.

In general, the indication of the desired information may be in the form of media content associated with an object(s) from the real world and/or meta-information providing properties of the media content and characteristics associated with the mobile device and the user. For example, the media content may be a digital photograph of a physical object (e.g., a restaurant façade, a store logo, a street name, etc.), a video of an event involving a physical object, a recording of music played during the event, etc. The meta-information may include, for example, properties of media content (e.g., timestamp, owner, etc.), geographic characteristics of the mobile device (e.g., current location or altitude), environmental characteristics (e.g., current weather or time), personal characteristics of the user (e.g., native language or profession), characteristics of user(s) online behavior (e.g., statistics on user access of information provided by the present system), etc.

The list of candidates for the desired information may include links to information items such as a web site, a phone number, a yellow page entry, an application, phone functionality, a keyword, computer functionality, an application state, a document, television program, a radio program, a music recording, etc. A link may have a name or title used for presenting the link to the user. When the user selects a link from the list of candidates, the user's mobile device performs an action associated with the link (e.g., sends a web browser to a web site, initiates a phone call, launches an application, initiates a particular state of the application, etc.). In addition, in one embodiment, the link itself contains a portion of information desired by the user. For example, the title of the link to weather forecast can contain a brief three-day weather forecast for the current location. Upon selecting this link, the user is presented with detailed weather forecast for the current location.

In one embodiment, the system generates the list of candidates by searching a database(s) for the currently received media content and/or meta-information and retrieving associated links. In one embodiment, the system populates links automatically (e.g., based on predefined logic or configurable rules). Alternatively, the system populates links based on input provided by end users, staff, partners, etc. For example, an end user may specify a link that should be associated with certain media content or meta-information. The system can support any number of sources for generating links and can be deployed as a "folksonomy." The term "folksonomy" used herein refers to a group of users spontaneously generating and organizing content without much central control. In one embodiment, the system monitors which links are selected by the users from the provided lists of candidates and integrates this knowledge to provide better candidates when performing new searches.

In one embodiment, links are categorized based on pre-defined categories. These categories may include personal or private links (that can only be accessed by a particular user), group links (that can be accessed by a specific group of users), global links (that can be accessed by all users), location-based links (corresponding to the current location, altitude, direction, orientation, speed, acceleration, etc.), etc. Links can also be categorized by the type of the information they provide (e.g., phone numbers, web links, applications, application states, phone functionality, etc.). Each link may have a set of properties such as a name or title, owner, timestamp, category, rights management information, etc. In addition, each link may include statistics pertaining to user access of a relevant link (e.g., frequency of accessing a link that may be divided by user or user groups, by time, or by other factors). In one embodiment, link properties and link statistics are part of meta-information that can be used when searching for appropriate links.

In one embodiment, the system maintains virtual photographic icons ("icons") generated through previous searches or pre-assigned by the users icons. An icon may represent particular media content (e.g., a picture, an image, a video, a music, etc.), or the aggregation of several media content items, meta-information, and corresponding links with their properties. A user can browse for objects from the real-world that are currently not in proximity using the icons. Icons can be listed in order, or maintained hierarchically based on factors such as the proximity to current location, time, or frequency of use of the link by the particular user, a segment of users, or the entire user community. A user can activate an icon by selecting it when browsing through the icons on the mobile device or some other device (e.g., a PC), or by taking a picture of an object in the real world that is represented by the icon. Icons can be categorized based on any type of parameters, and/or internal or external input.

The system includes a front-end component and a back-end component. The front-end component resides on the mobile device. In one embodiment, the back-end component also resides on the mobile device (an integrated client-server model). In another embodiment, the back-end component resides partially on the mobile device and partially on a network server or multiple network servers. In yet another embodiment, the back-end component resides entirely on a network server or is distributed across multiple network servers. A database may also reside on the mobile device or one or more servers. Alternatively, contents of the server database may be cached at least partially on the mobile device. The server or mobile client (push or pull model) could then evict data in the database on the client and replace it with new incoming data as the meta-information context on the client changes. In one embodiment, in which the back-end component resides at least partially on one or more network servers, media content and meta-information are sent to the servers immediately (e.g., in compressed format). Alternatively, the front-end component on the client performs partial processing of media content and meta-information and sends intermediate representations to the server(s). In yet another embodiment, the front-end component can send both the original media content and a relevant intermediate representation to the server(s). An intermediate representation does not contain the original media content, but only certain features and properties determined by analyzing the media content and/or meta-information.

In an alternative embodiment, servers send media content and meta-information relevant to a specific client (e.g., relevant to the region in which the user currently resides) to that client for caching. The client then does all the processing based on the cached data, and requests additional data from servers to update its cache (e.g., if moving to another geographic region, if time, weather, or the identity of individuals near the devices changes, if environmental or user characteristics are changed, or if links information such as link properties and statistics is changed). This update can be triggered by the client (pull mechanism) and/or the server (push mechanism).

Accordingly, embodiments of the invention provide a system that accelerates the time needed to access information. In contrast to conventional approaches, the system almost completely eliminates manual typing and significantly minimizes the number of clicks, maximizing the number of users accessing information through the system-provided links. The present system neither intrudes on conversations nor generates sound and noise. The system can link users to desired information or other functionality faster than possible with typing.

Next, the present system can link anything in the real world to anything in the virtual world, without requiring that objects be labeled with bar codes. The system works not only with objects in proximity, but also with objects that are not in proximity. The present system does not require the client device to be put down on a flat surface. Instead one can use the system when on the run. The system is fully integrated on the client, is independent of the surface type, and does not require an extra piece of equipment or any special paper. The system is extremely fast in submitting data due to minimal data transmission and its ability to work with any network and scale with the network organically. The system does not need to be trained to a person's handwriting.

Further, the present system does not require special components in the devices and has no adverse affects such as reduced battery life. It does not require the physical deployment of tags or infrastructure, does not require any changes on the client device, and does not have any external physical components in the field that require maintenance. The present system does not require the user to describe the search in words; instead, taking a picture and a few clicks can be fully sufficient (or even no click at all). The system requires the user to write little or no text at all to complete a search. The system can provide more targeted search results and can be implemented such that less screen size is sufficient.

Exemplary Architecture

Figure 1B:
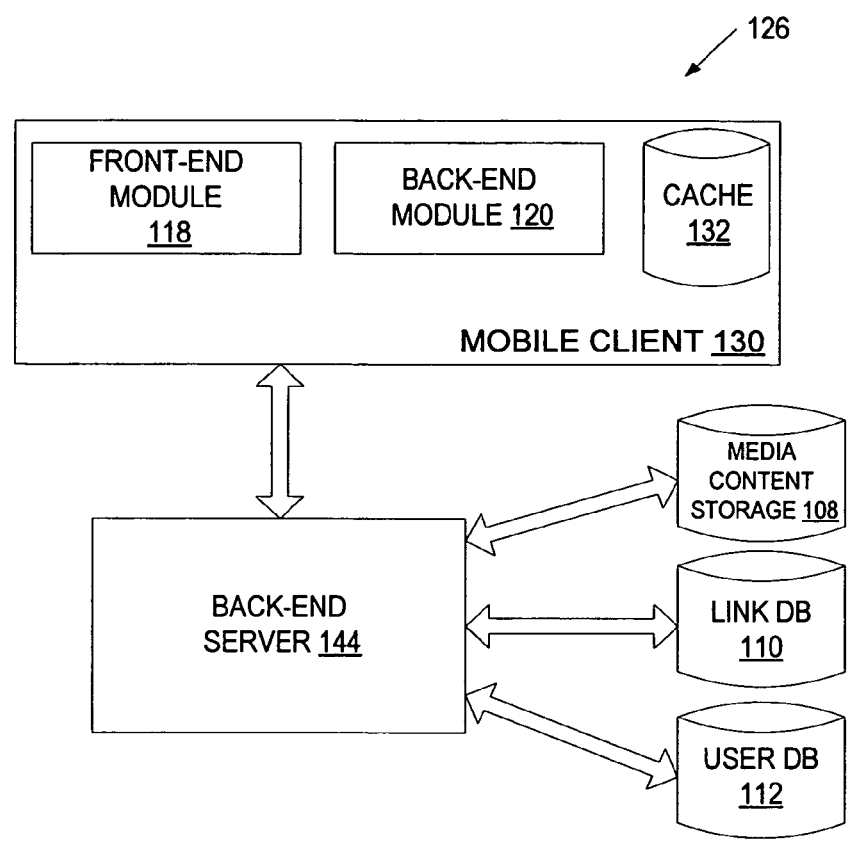

FIGS. 1A and 1B are block diagrams illustrating examples of two alternative system architectures in which embodiments of the invention may operate. Referring to FIG. 1A, the architecture 100 includes a mobile client device 102 that creates media content. In particular, the mobile client 102 may be a mobile phone, a PDA, a hand-held device, or any other mobile device that includes, or is coupled to, an optical sensor (e.g., a camera or camera phone), and/or a digital audio player (e.g., MP3 player), and/or other device producing and/or capturing media content. The mobile client 102 includes a front-end module 118 that handles interactions with the user of the mobile client 102 and communicates user requests to a recognition server 104.

The mobile client 102 is coupled to content providers 106 via a wireless or wired network (e.g., local network such as a local area network (LAN) or global network such as Internet). In some embodiments, content providers 106 represent external entities that provide information requested by the mobile client 102 or aggregate information provided by other content providers. In other embodiments, content providers 106 are internal components of the system 100. The provided information is linked to media content (e.g., images, photographs, video, or music recordings) created by a user of the mobile client 102.

The mobile client 102 is also coupled to the recognition server 104 via a network. The network may be an Internet connection, wireless LAN, WiMax, cellular, Bluetooth, cross bars, or any other means for transmitting and receiving data. The recognition server 104 includes a back-end component 120 that authenticates the user of the client 102 via a user database 112 and processes requests of the client 102. In particular, the back-end component 120 is responsible for receiving media content, meta information and links from the mobile client 102, associating links with the media content and/or intermediate representations of the media content and/or meta information, storing the media content in a media content storage 108, and storing the links, the intermediate representations, and meta-information in a link database 110. As discussed above, meta-information may include metadata associated with corresponding media content, as well as current characteristics of the mobile client 102 and personal characteristics of the user. Links map media content and/or meta-information to desired information items that can be provided by the content providers 106. A link may be stored with a set of link properties (e.g., title, owner, timestamp, rights management information, etc.) and statistics (e.g., frequency of accessing a link) and an identifier of each related media content and/or meta-information item.

The back-end component 120 is further responsible for receiving client requests for relevant links and searching the link database 110 for those links. In one embodiment, the back-end component 120 receives a client request with media content (e.g., an image) and searches the media content storage 108 for similar media content. Any similarity algorithm known in the art can be used to perform the search. If similar media content is found, the recognition server 104 retrieves the identifier of this media content and searches the link database 110 for links associated with the retrieved identifiers. If similar media content is not found in the media content storage 108, the back-end component 120 stores the media content in the media content storage 108 and generates links that can map this media content to potentially desired information items. The back-end component 120 may use predefined logic or customizable rules for the generation of the links. Similarly, if the back-end component 120 does not find any links associated with the requested media content, it generates links that can map this media content to potentially desired information items, as discussed above. The back-end component 120 may use a similar approach when processing a client request that includes meta-information in addition to, or instead of, the media content. The back-end component 120 may run in a regular or irregular interval (e.g., via a timer) to perform the above functionality.

In one embodiment, the back-end component 120 uses meta-information to constrain performed searches. This meta-information may include geographic information (e.g., latitude, longitude and altitude), environmental information (e.g., time of day, season, weather condition, etc.), and user characteristics (e.g., age, native language, occupation, etc.). Search constrains enable the recognition server 104 to improve accuracy and provide more desired information. For example, if trying to recognize a person walking down the street, e.g. to get a social networking profile (if available), with millions of potential people, location constrains can limit the search to a few near-by people and thus select most likely candidates for desired information. In one embodiment, the recognition server 104 is also responsible for managing contents of the link database 110 and user database 112 and tracking user behaviour for advertising, CRM or other similar purposes.

Figure 7:
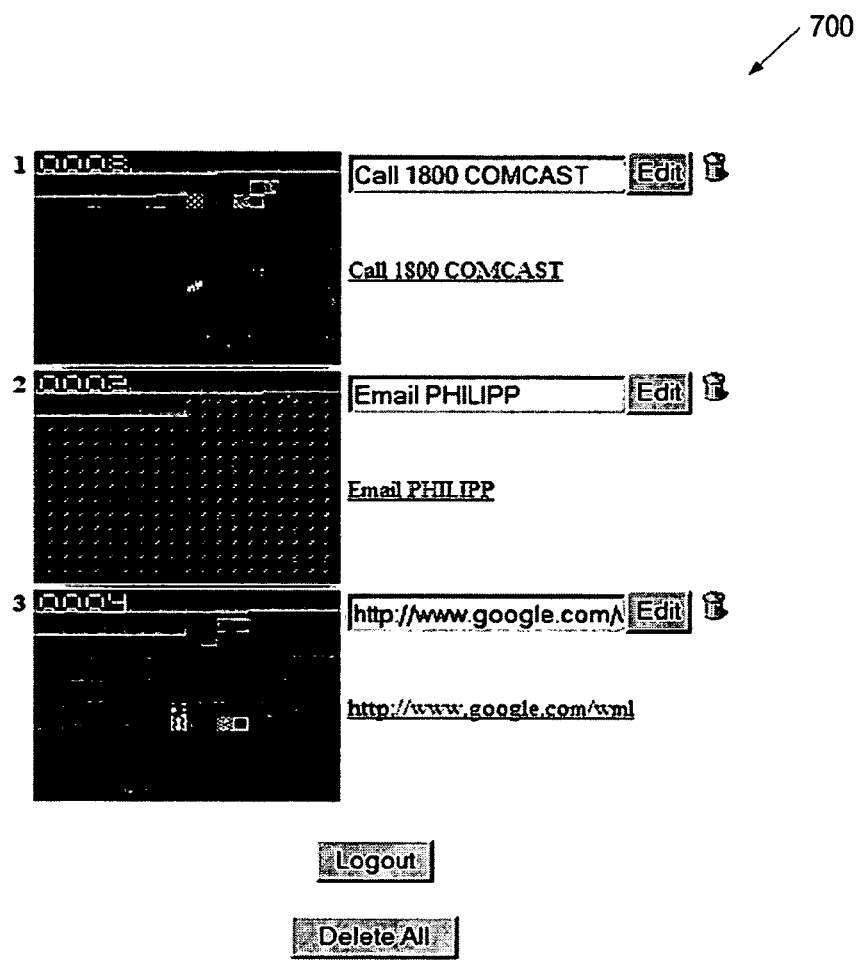
FIG. 7 illustrates an exemplary user interface (UI) provided by a portal server according to one embodiment of the invention.

In one embodiment, the architecture 100 includes a portal server 114 that may provide user account-management, link management and image management to users via a web-browser on a client device 116 such as a PC. Although not show, the management functionality of the portal server 114 can also be accessed via the mobile client 102. Special user accounts might also give users additional rights (e.g., for advertising partners) such as managing links, creating or deleting users, changing recognition parameters. FIG. 7 illustrates an exemplary UI 700 provided by a portal server according to one embodiment of the invention. The UI 700 allows users to browse media content items that they, a certain group of users, or all users have tagged (i.e., created links or meta-information for). In addition, the UI 700 allows users to modify meta-data associated with the media content, and modify properties of the links associated with the media content items.

A person of ordinary skill in the art will appreciate that any of the described components of the architecture 100 can be integrated or rearranged, and additional components can be added, without loss of generality. In addition, the components can run on a single device, be combined, clustered or separated in any way, distributed across multiple servers, etc. The system architecture 100 can be configured in a variety of different ways, including for example, a terminal device and a backend server; a terminal device and one or more server-farms; a terminal device doing most of the processing and a backend server or one or more backend server-farms; a terminal device doing all of the processing and only accessing the servers to retrieve and/or store data (all data or only some data, the rest being cached on the device) or not accessing the servers at all, having all data directly available on the device; and several terminal devices exchanging information in ad-hoc manner.

FIG. 1B is a block diagram illustrating an example of an alternative system architecture 126 in which embodiments of the invention may operate. According to the architecture 126, the mobile client device 130 hosts both the front-end module 118 and the back-end module 120. The front-end module 118 handles interactions with the user of the mobile client 102 and communicates user requests to the back-end module 120. The back-end module 120 may perform most of the back-end processing discussed above, while a back-end server 144 performs the rest of the back-end processing. Alternatively, the back-end module 120 may perform all of the back-end processing, and only access the server 144 to retrieve and/or store data (all data or only some data, the rest being cached on in a cache 132). Yet, in another configuration (not shown), the back-end module 120 may not access the servers at all, having all data directly available on the mobile client 130.

The cache 132 may store meta-information context relevant to the user of the mobile client 130. In addition, the cache 132 may store also media content and/or intermediate representations of the media content. The server or client (push or pull) may then evict data in the cache 132 and replace it with new incoming data as the meta-information context on the mobile client 130 changes, as discussed in more detail above.

In one embodiment, the architecture 100 or 126 includes several recognition servers 104 or backend servers 144 respectively to perform server-side calculations and data access with minimum additional delay for numerous users.

Furthermore, if users from various geographies need to be served, multiple servers 104 or 144 are geographically distributed to serve each geography with better performance. As users roam across servers, data between the servers 104 or 144 can be exchanged, swapped out and cached to optimize performance.

Figure 2:
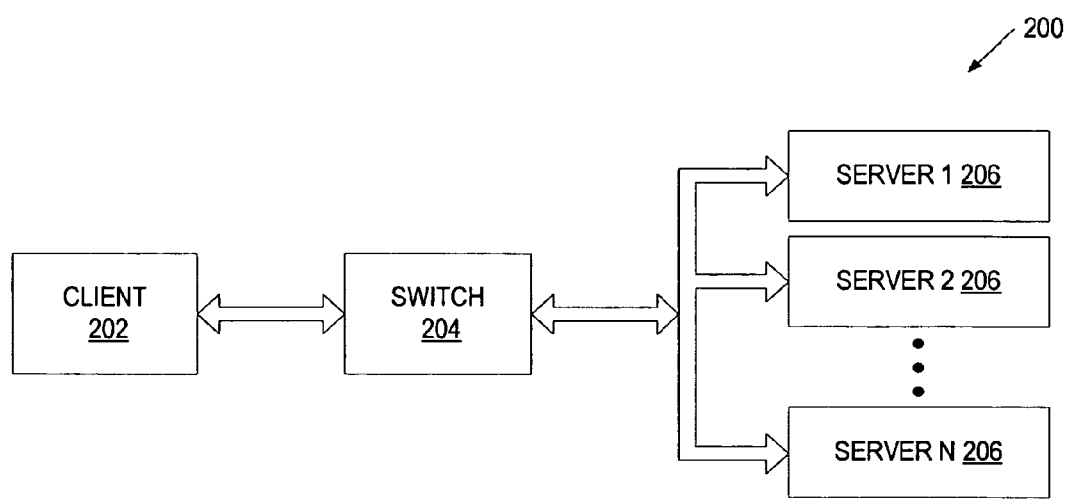
FIG. 2 illustrates a system providing distribution of recognition servers according to one embodiment of the present invention.

FIG. 2 illustrates a system 200 providing distribution of servers according to one embodiment of the present invention. The system 200 includes a client 202, a switch 204, and multiple servers 206. The switch 204 selects a server 204 for processing requests of the client 202 based on predefined meta-information. This meta-information may include, for example, 2D or 3D location information, a target database, time, weather, season, date, user information, proximity to other devices, etc.

In one embodiment, a hub is used to branch to different continents (e.g., North America, Europe, Asia, etc.) and further to switches 204 based on such factors location. Servers 206 can be added as needed, allowing the system 200 to grow organically.

The media content storage (e.g., storage 108) can also be distributed and/or replicated across different locations. Certain media content may be co-located with servers 206 by location and hence many not need to be replicated (except for backup purposes). Content media items that are used by a minimum number of users (e.g., as definable through the administrator) may automatically be co-located. Other items may be user-located and roam across servers as users move or be located in a home-space or on the actual device.

User database can be distributed and stored across multiple locations and servers by, for example, letters of the alphabet, location of the user, home location and any other pre-determined factors to load-balance requests. Directories discussed in more detail below and other data can also be distributed (e.g., by language, best network location, etc.).

In one embodiment, the system dynamically shuffles data between different regional servers and caches them as needed to serve users in the best, efficient way. One can forecast users potential positions within the minimum time required to transfer the according data, e.g., by taking typical travel speeds into account (high-speed train, car, etc.) for different regions. The system can shuffle the data around accordingly so that it gets transferred to all potential new locations in time. Data can be evicted if it turns out that the user changed its course and the data is no longer needed at a particular regional server.

Front-End Functionality

Figure 3:
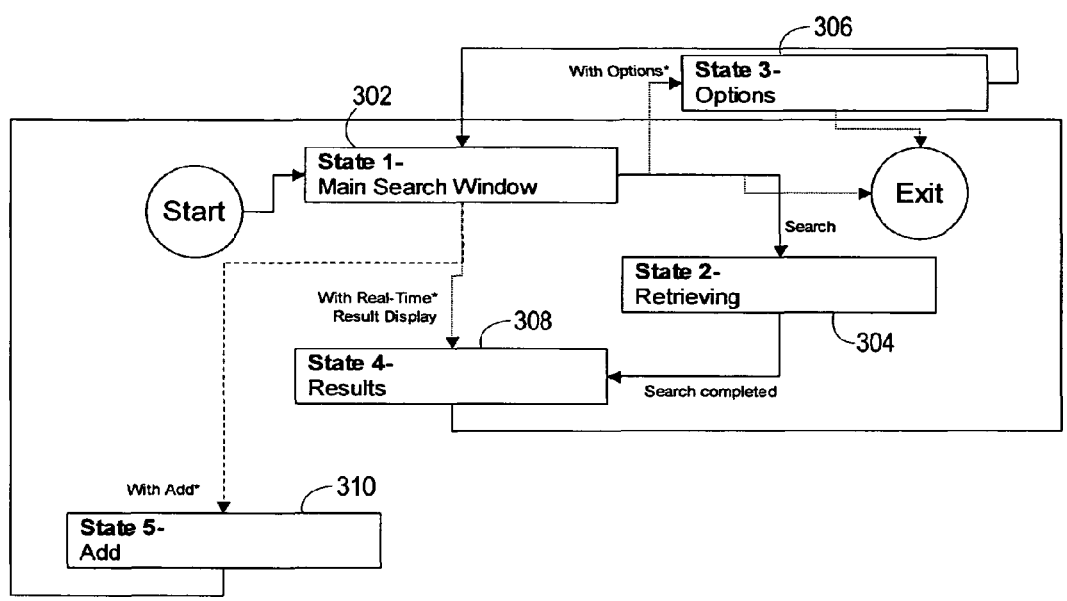
FIG. 3 illustrates a client state machine according to one embodiment of the invention.

FIG. 3 illustrates a client state machine according to one embodiment of the invention. The client device or terminal can be in several application states. The start state can be reached by a user activating the application (e.g., selecting it from a menu), by a user pushing a designated button, or by the client itself (e.g., via automatic boot or as an operating system). The start state may lead to state 1 of the application, although any number and type of intermediate states could be inserted.

State 1, labeled as 302, provides an initial user interface. FIGS. 8A through 8E illustrate exemplary UN provided in state 1 according to some embodiments of the invention. These UIs include a search window containing a viewfinder. The view-finder may provide a visual representation of the data collected by the optical sensor. The data can be compressed to limit data bandwidth and/or colour-corrected. The data is usually updated in real-time or close-to real-time as the client device and/or optical sensor is moved around by a user. This view-finder can be part of a larger screen, design, animation, desktop or other interface or it can be an individual component.

Figure 8A:
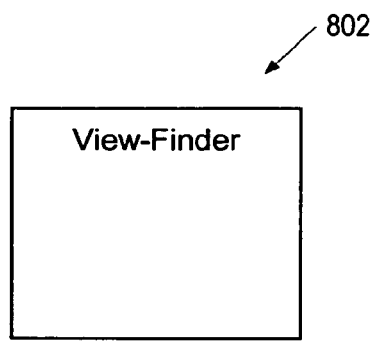
FIGS. 8A through 8F illustrates exemplary UIs provided by a front-end module according to some embodiments of the invention.

Referring to FIG. 8A, UI 802 provides a search window that only contains a view finder. Clicking a dedicated button or buttons, or providing any other means of input can move the application to state 2, labelled as 304.

Figure 8B:
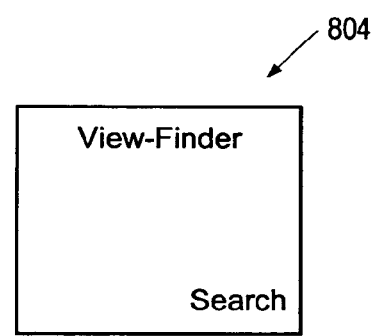

Referring to FIG. 8B, UI 804 provides a search window that contains a view finder with a search button. The search button can be positioned anywhere on the screen and activated by dedicated buttons, by point and click, by a keypad or any other means of input. The activation of the search button moves the application to state 2. The search button can be labelled with any word, graphical icon, animation or any other design.

Figure 8C:
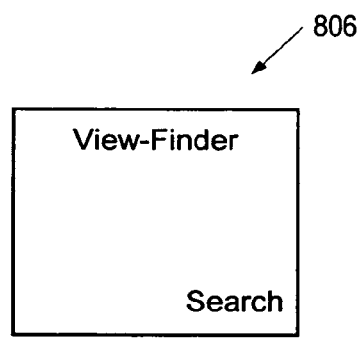

Referring to FIG. 8C, UI 806 provides a search window that contains a view finder with a search button and an options button. The search and options button can be positioned anywhere on the screen and be activated by dedicated buttons, by point and click, by a keypad or any other means of input. The activation of the search button moves the application to state 2. The activation of the options button moves the application to state 3. The search and options buttons can be labelled with any word, graphical icon, animation or any other design.

Figure 8D:
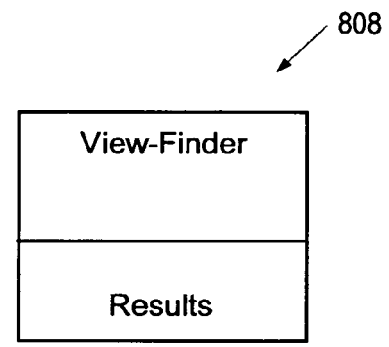

Referring to FIG. 8D, UI 808 provides a search window that contains a view finder 810 and a result box 812 for providing real-time search results. On high performance terminals, results can be calculated and displayed in real-time. The results box 812 can be displayed anywhere on the screen. It can be separated from the view-finder 810, or overlaid over the view-finder image/video or any other display element (e.g., semi-transparent, embossed or in any other way). Results can also be tagged to objects in the real-time image/video/scenery, and regions of the image can be shaded, marked, etc. to illustrate what a tag belongs to. This type of tagging/shading/marking can be optionally provided to improve the user experience. As discussed above, the titles of the resulting links may include previews to the information (e.g., 3-day weather forecast or quick traffic summary), so the user may need to click the link only if he or she wants to see more detailed information. The results box 812 can display any number of results (e.g., one to ten), depending on design, system parameters and performance. The results can be selected or activated by any input and take the application directly to state 4, skipping state 2.

Figure 8E:

FIG. 8E illustrates an exemplary UI 816 showing results overlaid on top of live real-time video. The video displays the façade of a restaurant, and the results displayed in real time include links to information that may be of interest to the user. If the user wants to browse any of these information items, the user just needs to make a single click to access the desired information. This capability is referred to herein as single-click information access. The term "click" used herein refers to any user operation for requesting information (e.g., clicking a button, clicking a link, pushing a key, pointing a pen, finger or some other activation device to an object on the screen, manually entering information on the screen (e.g., a website URL), etc.).

Alternatively, if the title of the link already includes a preview of the information (e.g., a brief 3-day weather forecast), the user can see this preview without making any clicks at all. This capability is referred to herein as zero-click information access. For example, the user may just point to the sky with his or her camera phone, and the 3-day weather forecast automatically appears on the screen as the tile of the link. If the user wants to get more details about the weather forecast, the user just needs to make a single click on the link to see more details.

In one embodiment, a timer is used to trigger real-time searches in regular or irregular intervals. In particular, when the user points to objects, real-time searches are periodically performed based on regular or irregular intervals determined via the timer.

Referring back to FIG. 3, selecting the search button or pressing another "camera" button (e.g., joystick) takes a picture or records a short video, and takes the application to state 2. Note that any number and type of intermediate states could be inserted between this state transition.

In state 2, the client is retrieving links associated with a photograph or video created at state 1. Once the retrieval is completed, the application moves to state 4, labeled as 304. Any number and type of intermediate states could be inserted between this state transition. For example, intermediate states could do additional checks such as what age group does the user belong to, which extra services did a user subscribe to, are there newer version of the software available, etc. The system can also playback a sound or music track, while retrieving data (optionally customizable) or playback a sound to inform the user of the retrieval being done as the system switches to state 4. The system could also show the image/video while retrieving. The image/video could be modified from the original (e.g., by scaling, colouring, or adding animation effects).

In state 3, labelled as 306, various options dialogs can be provided. For example, a username or password could be entered (or another ID be used such as phone number on SIM card, SIP ID, etc.). Also, various other options can be set in state 3. These options may specify, for example, location or sensor information to be used, the level of precision to be applied, servers to link up, a user segment the user belongs to (e.g. business user, child, sports fan, etc.), a link categories to display, etc. The current settings may control which links should be returned to the user. For example, the system would more likely return sport-related links (if available) to a sports fan, while returning more children-friendly links to children. Any of the settings could be hard-locked and be accessible only by a designated individual, e.g., via key codes. The system could also provide access to any other options typically found in a PC, laptop, PDA, phone or any other similar device. Within the option menu, the user can cancel her edits of the settings or confirm the settings. In response, the application transitions back to state 1. Settings could be stored on the client itself, on another client, on a server, on several servers, or anywhere else in any way.

After the image/video is processed by the client and/or server(s), the search results are presented in state 4, labeled as 308. The server submits to the client links to information but not the information itself. Links, when activated, may cause the client to perform a certain activity (e.g., opening a certain web-site in a browser, calling a designated number, launching a particular application, launching a particular application with a certain application state, activating a certain application state, writing an email, SMS, fax, MMS or other message, sending a picture, creating a reminder, creating a calendar entry, creating an item on a task list, etc.). The type of link could be illustrated by a keyword in front of the link (e.g., http://, Call or Email), by appropriate graphical symbols/icons, or any other means.

The results can be represented in a linear list, in a ranked listed, in a colored or numbered list (to illustrate importance), in any sort of hierarchy (e.g., by category, frequency of use by multiple users, frequency of use by particular user, static vs. moving objects, global vs. personal item, target age group, correlation or any other measure, input or categorization), in the form of a tree, a zoomable map, a graph, a star-shaped hierarchy, a list of icons, a list of text or other techniques known in the art.

The results can also be categorized. Possible categorization includes personal or private links (that only a particular user has access to), group links (to which certain sets of user have access), global links (to which all users have access), location-based links (links that are in proximity of the current location and optional altitude), and any other factor/input to create a category. Links can also be categorized or clustered by the information type they link to (i.e. phone numbers, web links, applications, application states, phone functionality, etc.).

Figure 8F:
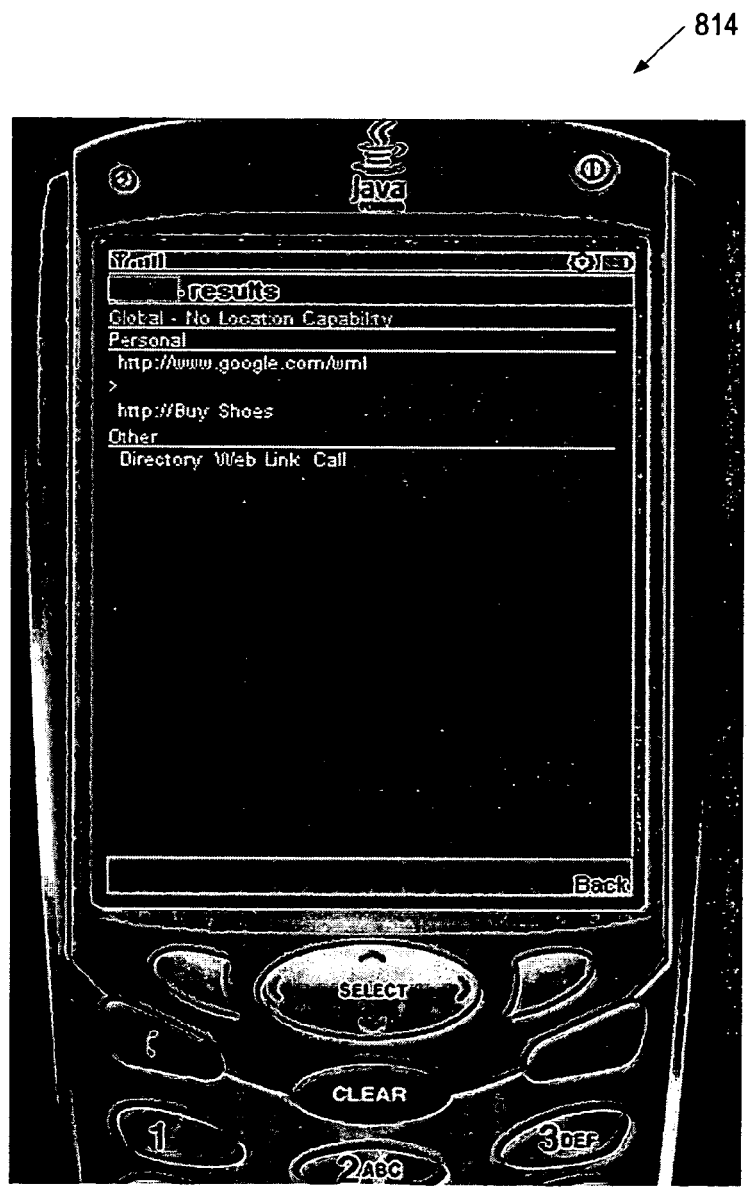

FIG. 8F illustrates an exemplary UI 814 providing a linear list of search results on a mobile phone, according to one embodiment of the invention. These results can be continuously updated in combination with the View-Finder and Results Box as described above. Alternatively, the results can be presented statically. The real-time system can be implemented in similar fashion as the non-real-time system, with the recognition steps taking place directly on the mobile device due to network delays. The image recognition may be automatically triggered in a regular or irregular interval, depending on the performance of the mobile device.

Returning to FIG. 3, once the results are presented at state 4, a user can select any of the given links. Links could link to further question dialogs (additional states) or could directly cause a function to be performed such as sending a web-browser to a certain site, launching a particular application or any of the other functions described above. In one embodiment, if the results are not sufficient to the user, the user is presented with a special directory of links for selection, or the user is allowed to create any new link. Once a link is selected or added, the application returns to state 1. Any number and type of intermediate states could be inserted between this state transition. In an alternative embodiment, the system directly activates the link of the best match. The system can also tell the user that there was no match if the image/video taken for the search is not within certain constrains of the existing images/videos in the database (e.g., similarity, color range, shading, texture, shape, etc.). However, such an approach is likely to perform worse than the approach that represents several link results as discussed above. Part of the reason for this poorer performance is that objects oftentimes have various associations and not just one. A movie poster can be associated with movie times, with a trial for the particular movie, with a video store, etc. Further, the approach of directly activating the best result and/or telling the user if there is no match within certain constrains does not benefit from reinforcement through users' selecting certain links over others. This kind of reinforcement is important in scaling the system, database and its coverage. Hence, the approach of representing various search results is generally superior.

In contrast to systems that send messages (e.g., SMS or MMS) back with results, the system described herein can directly represent the results within the application, significantly reducing the number of clicks necessary to access results.

In state 5, labelled as 310, links can be added based on user input. Links can be added at any time directly from the view-finder displayed in state 1. The system can provide various options such as a special directory, entering web links, phone numbers (including, for example, phone numbers from the address book), selecting applications, etc.

Figure 4:
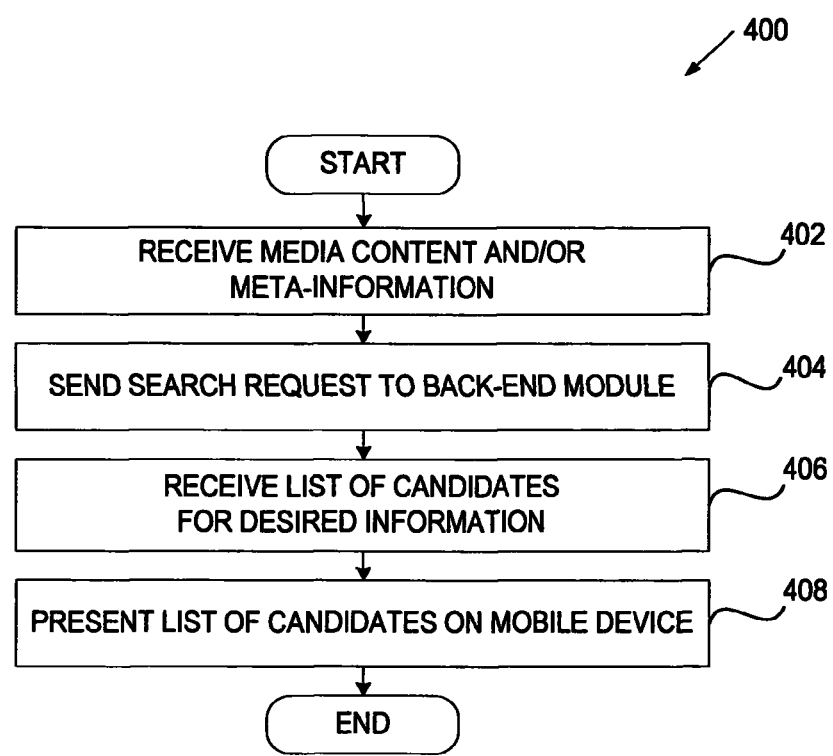
FIGS. 4 and 5 are flow diagrams of client-based methods performed according to some embodiments of the invention.
Figure 5:
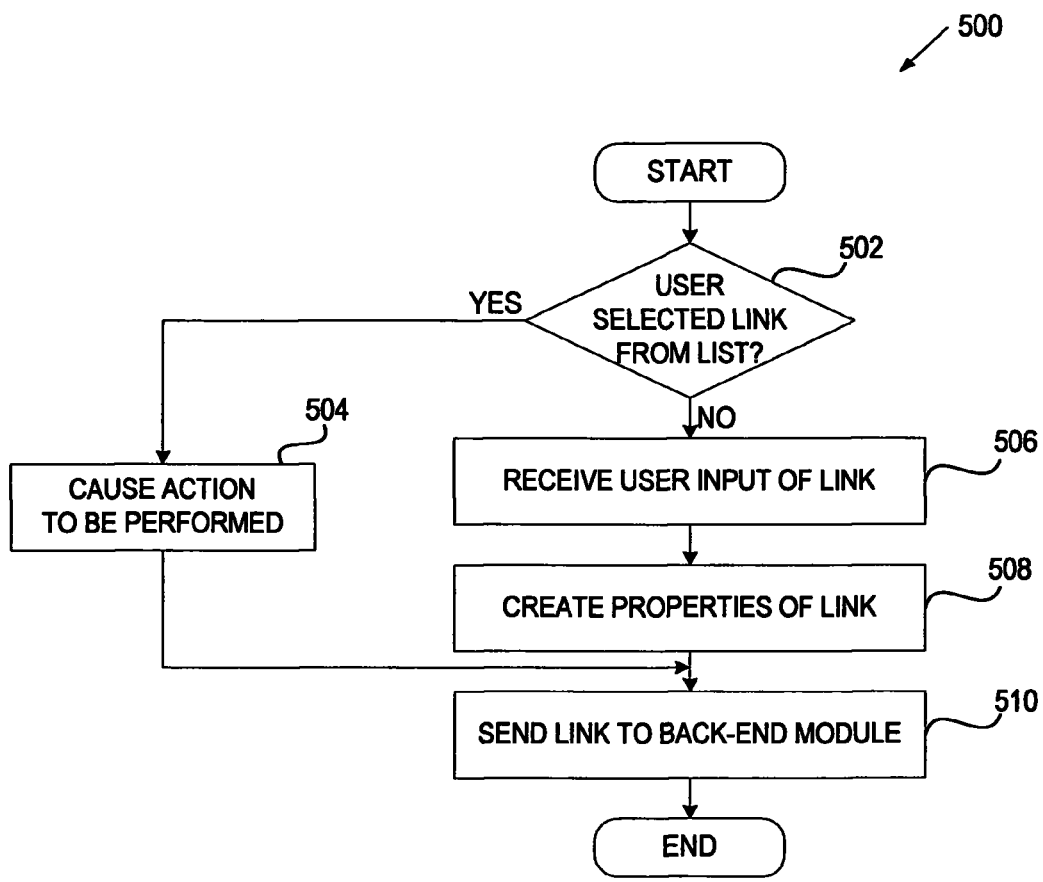

FIGS. 4 and 5 are flow diagrams of front-end methods performed according to some embodiments of the invention. The methods may be performed by processing logic that may comprise hardware (e.g., circuitry, dedicated logic, etc.), software (such as run on a general purpose computer system or a dedicated machine), or a combination of both. In one embodiment, processing logic resides in a front-end application 600 discussed in more detail below in conjunction with FIG. 6.

FIG. 4 is a flow diagram of one embodiment of a method 400 for providing desired information to a user of a mobile device. Method 400 begins with processing logic receiving an indication of information desired by a user, where the indication may be in the form of media content and/or meta-information (block 402). The media content may be, for example, a digital photograph or video recorded by the user via an optical sensor integrated into, or coupled to, the mobile device, or music recorded by the user via an digital audio player integrated into, or coupled to, the mobile device. The meta-information may include, for example, metadata of the media content (e.g., the creation time, the label, the owner, etc.), characteristics associated with the mobile device (e.g., location, weather, altitude, etc.), personal characteristics of the user (e.g., age, occupation, native language, etc.), links information (e.g., link properties and statistics), or any combination of the above.

At block 404, processing logic creates a request including the media content and/or meta-information, and sends the request to a back-end module. Alternatively, processing logic creates an intermediate representation of the media content, and sends it instead of, or in addition to, the media content.

At block 406, processing logic receives a list of candidates for desired information. In one embodiment, the list includes links to desired information items, as discussed in more detail below. At block 408, processing logic presents the list of candidates for the desired information on the display of the mobile device.

FIG. 5 is a flow diagram of one embodiment of a method 500 for adding new links to a database. Method 500 begins with processing logic determining whether the user has selected a specific link from a list of displayed link (block 502). If so, processing logic causes the mobile device to perform an action associated with the link (block 504). If not, processing logic waits for the user to provide a link. In one embodiment, processing logic allows the user to input the link m annually. Alternatively, processing logic presents a directory of links and waits for the user's selection of a specific link from the directory.

Figure 10:
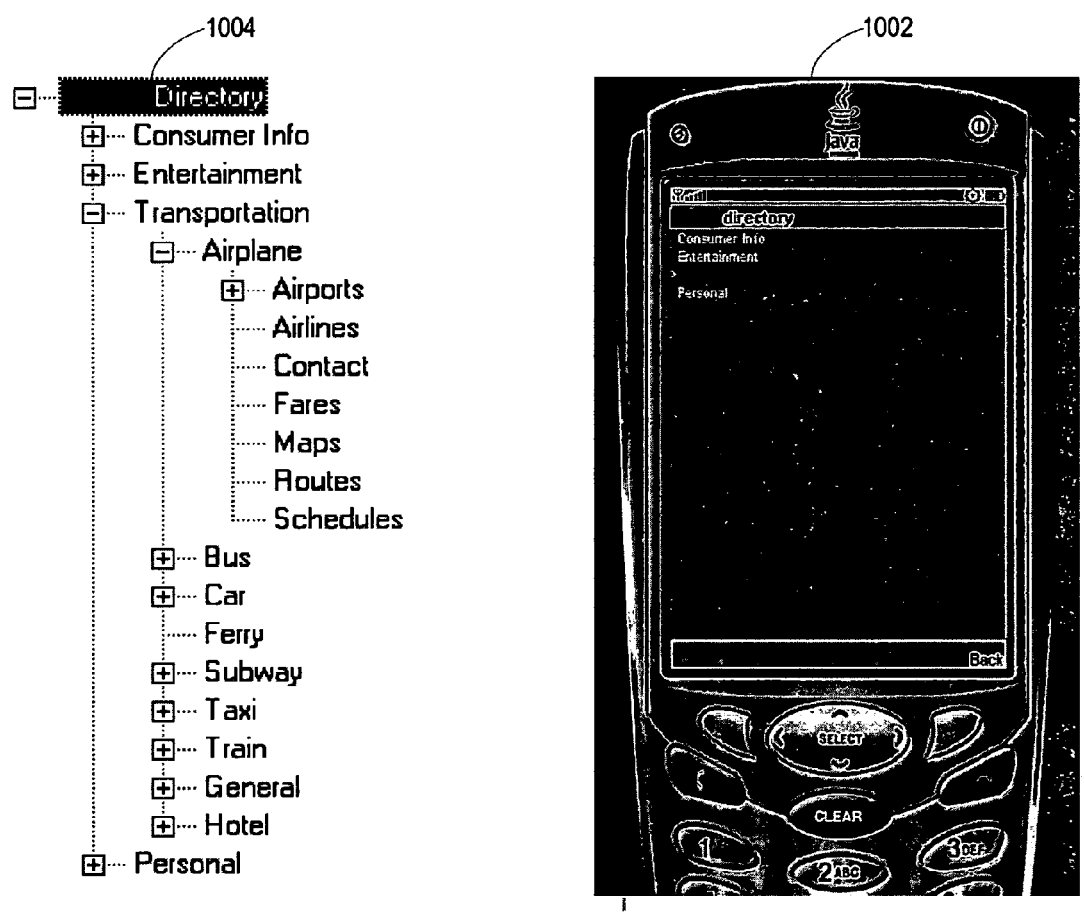
FIG. 10 illustrates an exemplary UI that presents a link directory to a user, according to one embodiment of the invention.

FIG. 10 illustrates an exemplary UI 1002 that presents a link directory 1004 to a user, according to one embodiment of the invention. The directory 1004 points users to relevant web sites, phone numbers, applications and other links. The directory can be cached or stored on the client, eliminating the need to navigate from site to site to browse the directory; rather browsing the directory appears like browsing through the menus of a standard software application. The directory can be represented in a free-like fashion, in linear lists that branch into other lists or any other format. A versioning scheme can ensure that the directory is updated. This scheme also enables previously linked objects to be re-linked to new or existing information items via an external system management application controlled by a user or administrator. The re-linking can be done based on user selection of candidate links or some external factors. For example, initially a BMW logo might be linked to a BMW fan site, but then the system management application can find new related sites and pictures and manually re-link them to the official BMW corporate website.

Returning to FIG. 5, at block 508, processing logic receives the link specified by the user (manually or by selecting a directory entry). At block 510, processing logic creates properties of the link (e.g., title, owner, timestamp, access information, etc.). At block 510, processing logic sends the link with its properties to the back-end module for storage in a link database.

Figure 6:
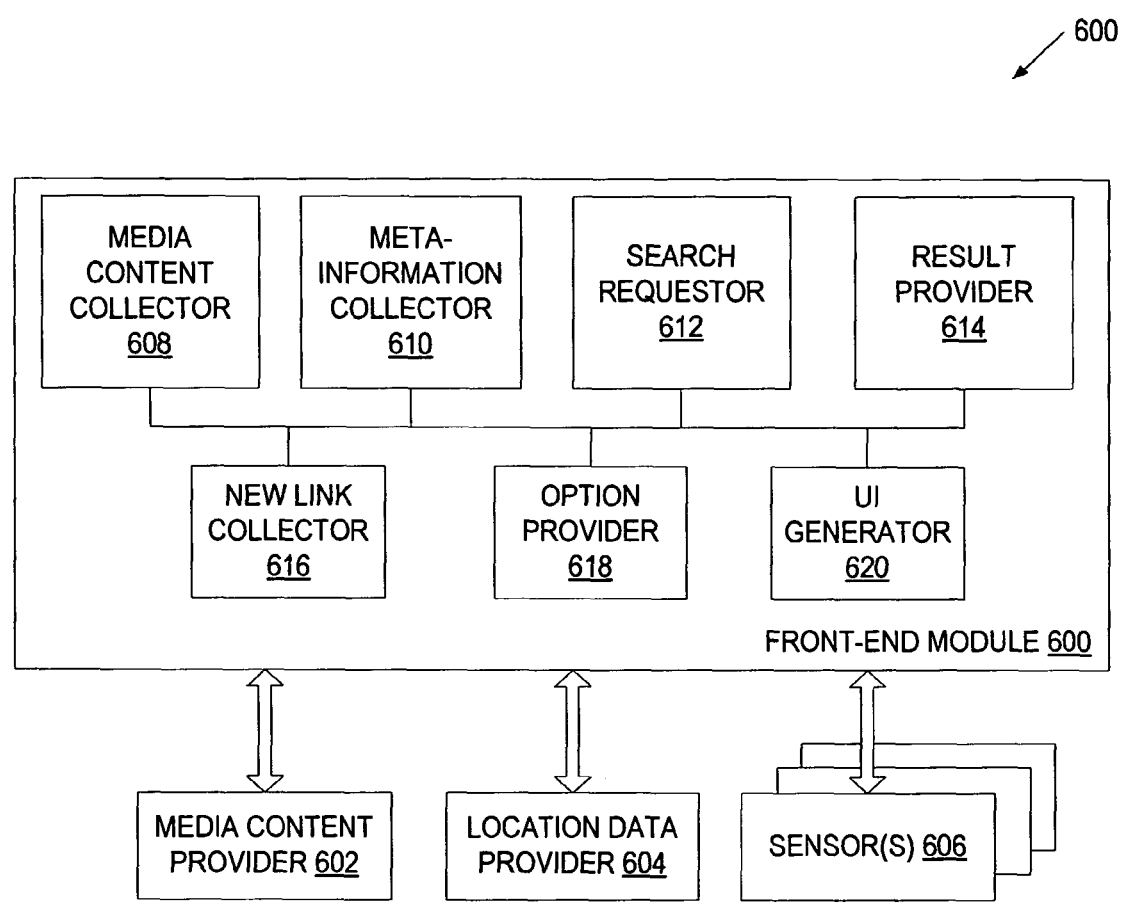
FIG. 6 is a block diagram of one embodiment of a front-end module.

FIG. 6 is a block diagram of one embodiment of a front-end module 600. The front-end module 600 may include a media content collector 608, a meta-information collector 610, a search requestor 612, a result provider 614, a new link collector 616, an option provider 618, and a UI generator 620.

The media content collector 608 is responsible for receiving media content created by the user of the mobile device via media content providers 602 that may be incorporated into, or coupled to, the mobile device. The media content providers may include, for example, an optical sensor (e.g., a digital camera or phone camera), a digital audio player (e.g., an MP3 player), etc.

The meta-information collector 610 is responsible for collecting meta-information provided by a location data provider 604, sensor(s) 606, and/or manually entered by the user. The location data provider 604 can provide GPS coordinates (longitude, latitude), cell IDs, MAC addresses of close access points, signal strength values, shapes, and any other coordinate system. The location information can include 2D location information and 3D location information, including also height or altitude. The 3D location information can enable the system to distinguish caves, different floor levels, etc. The location data provider 604 can also provide direction, velocity and acceleration.

In one embodiment, the location information is not required to allow user to transition between non-location-based service and location-based service as they upgrade their devices or even transition back and forth in case there is a limited location coverage. If the mobile device is not equipped with a location data provider, the front-end module 600 may automatically provide a link or other way to purchase an appropriate location enabling technology (extra module, upgrade of existing device from existing provider, supplier, partner, or a new provider, supplier, partner; or any other entity). This type of integrated promotion based on the system parameters can be used for locationing and/or positioning equipment, as well as any other enabler for the system.

The sensors 606 may include audio samples (e.g. background noise), RFID (e.g. proximity), Bluetooth, any other wireless interface, temperature sensors, smell sensors, sensors that measure body parameters, motion sensors, accelerometers, brightness sensors, or any other sensor providing input that can enhance and simplify the search experience.

In one embodiment, the meta-information collector 610 provides for tagging media content with meta-information such as location, time, date, season, weather, etc. The tagging may performed based on user input or automatically using information provided by the sensors 606 and the location data provider 604.

The search requestor 612 is responsible for creating search requests and submitting the search requests to the server. The search requests may include media content and/or meta-information obtained by the media content collector 608 and the meta-information collector 610.

The result provider 614 receives search results from the server and provides them to the UI generator 620 for presentation to the user. The option provider 618 is responsible for managing settings associated with the front-end module 600 and allowing the user to provide and modify those settings.

The new link collector 616 is responsible for obtaining new links specified by the user (e.g., via a link directory or manual input) and sending the new links to the back-end module. In one embodiment, the new link collector 616 also tracks links selected by the user from generated lists of candidates and submits these links to the back-end modules.

The UI generator 620 is responsible for presenting UIs to the user. In one embodiment, the UI generator 620 integrates a power-save mode into the view-finder to prolong short battery life-time. In particular, the view-finder picture can freeze, turn gray-scale or have other effects to illustrate the power-save mode. Pressing a key can wake the client up from power-save mode and reactivate the view-finder (e.g., by hitting the star key, the star key with another key or any other combination of keys). In some embodiments, fingerprint sensors or other authentication methods are used to facilitate transition in and out of the power-saving mode.

In one embodiment, a timer is used to activate the power-save mode (possibly with different level of granularity). The timer may learn from the typical user patterns (e.g., time between usage correlated with image data, time of data, regions, or any other factor, correlations, thresholds, etc.) and adjust itself accordingly. For example, while walking, a specific user might use the system more often and the system could avoid unnecessarily going into power-save mode for a short time span. While driving, the same user might rarely use the system and the system should almost immediately after the use go into the power-saving mode. This type of behavior may be learned from, based on, and correlated to the collected meta-data.

In one embodiment, the preview of photographs can be improved by zooming the camera via a button (e.g., up and down on joystick or keypad). Since the resolutions of cameras are often-times much higher than the screen of a mobile device, the system can also automatically zoom into items by estimating the size and position of the object at which the camera is pointing. The additional resolution of the camera results into a reasonably looking preview picture on the mobile device with a close-up view of the aimed-at object.

In one embodiment, the front-end module 600 continuously shows the top link/activity or top three or top X activities (e.g., as an overlay on top of the video/view-finder, on the side next to the image somewhere, on a different screen or different device, etc.). In addition, the front-end module 600 may also display information, applications, their states, or other data as the user points the camera onto an object. An abstract or summary may be presented instead of the full extended content, or even the full content can be displayed right away depending on the system configuration and performance.

In one embodiment, the front-end module 600 also provides a one button distribution function that allows a user to activate the button or menu item to automatically broadcast out the front-end module 600 to nearby devices (e.g., via Bluetooth, RFID, wireless LAN or any other means of communication). In addition, the application can be sent via any mechanism (email, SMS, mms, ftp, http download or any other mechanism) to any other person. In one embodiment, activating a button or menu item would lead to a selection screen or multiple screens to determine a recipient or group of recipients.

FIGS. 9A through 9G illustrate exemplary UIs presented by the front-end module 600 according to one embodiment of the invention.

Figure 9A:
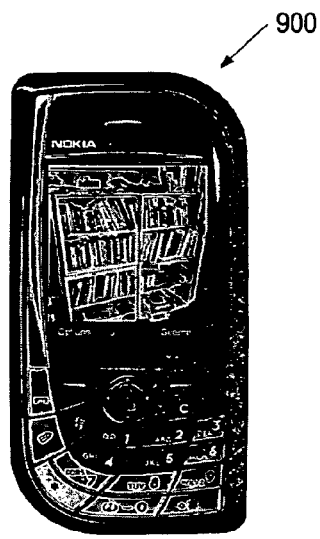
FIGS. 9A through 9G illustrate exemplary UIs presented by a front-end module according to one embodiment of the invention.

Referring to FIG. 9A, a UI 900 shows a main search window provided during state 1 of the front-end module 600. The UI 900 displays a picture of a bookshelf taken by the user.

Figure 9B:

Referring to FIG. 9B, a UI 902 shows transitioning to state 2 of the front-end module 600. The search button is highlighted to indicate that the search ahs been submitted.

Figure 9C:
Figure 9D:
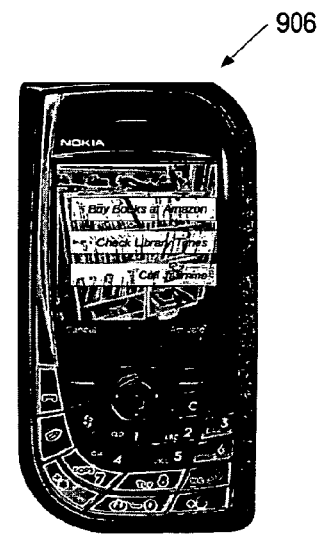

Referring to FIG. 9C, a UT 904 shows retrieving of information and transitioning to state 4. FIG. 9D shows a UI 906 presenting search results to the user.

Figure 9E:
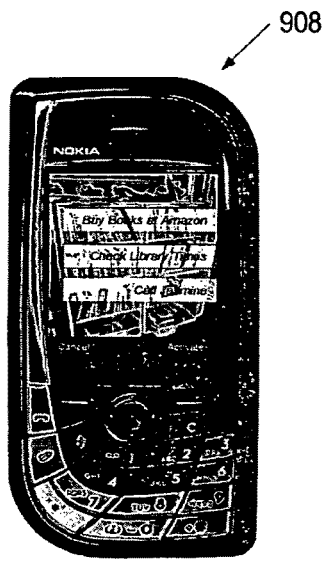

FIG. 9E shows a UT 908 that allows the user to browse search results. The UI 908 may also provide a directory button to activate a link directory. In addition, the UI 908 may allow the user to manually enter other links if none of the displayed links are sufficient.

Figure 9F:
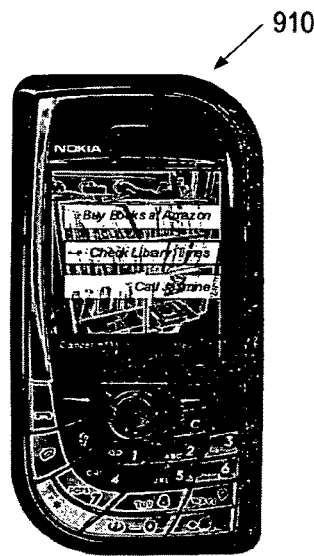
Figure 9G:
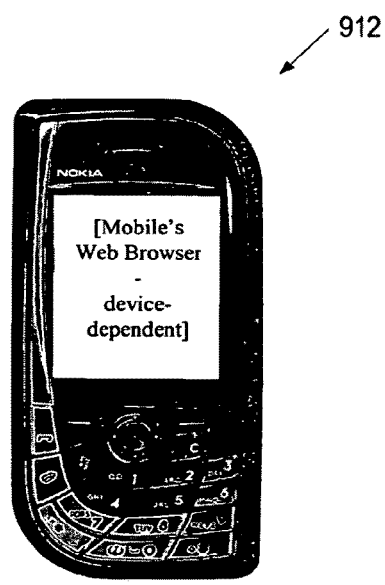

FIG. 9F shows a UT 910 illustrating the user's activation of a selected link. FIG. 9G shows a UT 912 illustrating the result of the activation that has caused the web browser to launch to display the link.

Back-End Functionality

Figure 11:
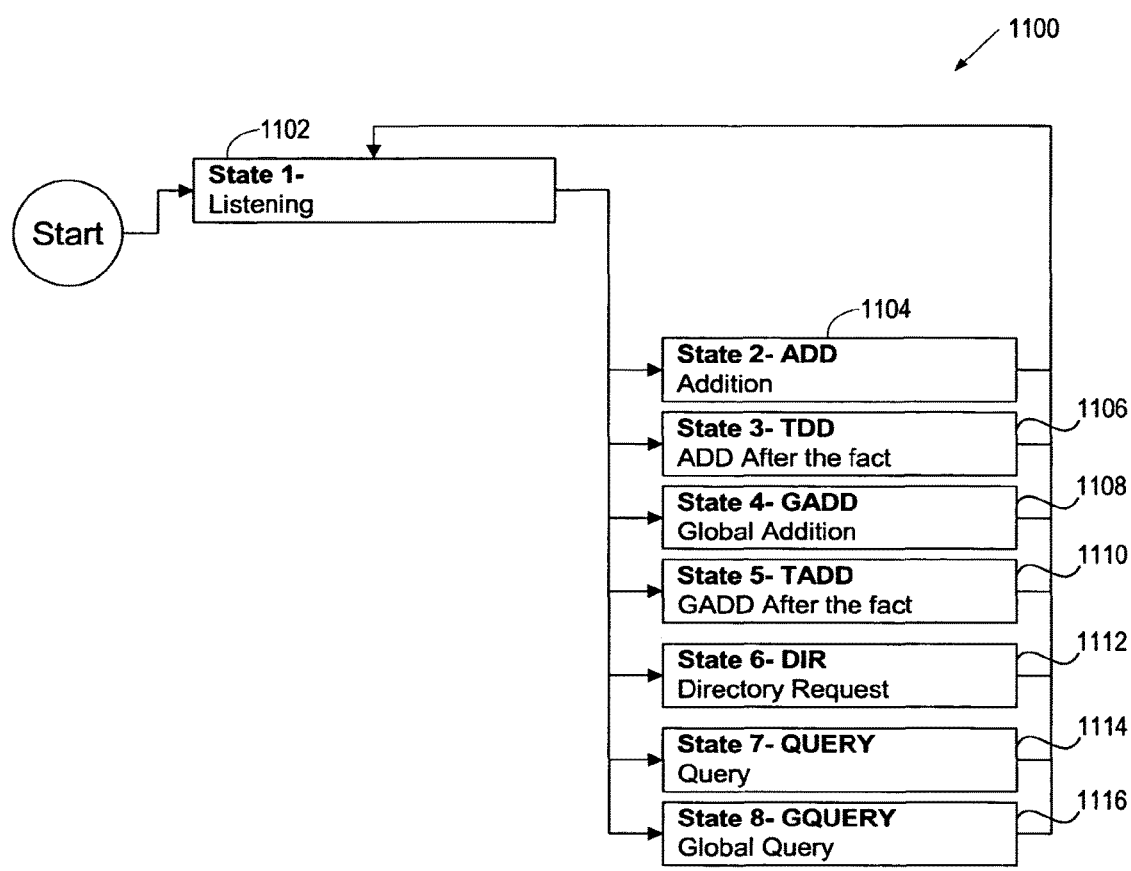
FIG. 11 illustrates a server state machine according to one embodiment of the invention.

FIG. 11 illustrates a server state machine according to one embodiment of the invention. The server can be in several application states. Incoming and outgoing traffic can be encrypted, non-encrypted or partially encrypted.

In the listening state 1, labelled as 1102, the server waits for an input from any client (may also be on the same client device, e.g., an integrated client-server model). Once an input is received (from any type of input channel, e.g., network), the input gets processed and classified. If the input is of a predefined request type (ADD, TDD, GADD, etc.), the application moves to the appropriate state as described below.

If the input is an ADD request, the server enters into ADD state 2, labelled as 1104. The ADD state 1104 adds the user-specified movie, picture or other media content, and/or meta-information to the database for the specified user account (possibly distributed and synchronized across servers). The database can also be cached on the client and synchronized based on location, time and other factor. An ADD is not of "global nature" and hence does not include location/altitude information. "Global nature" in this context means that the added "icon" could be globally accessible (e.g., to any user or any user group that includes users other than the user who initiated the addition). Once ADD is completed, the application returns to the listening state 1102.

If the input is a TDD request, the server enters into TDD state 3, labelled as 1106. The TDD state 1106 adds the movie, picture or other media content, and/or meta-information specified in the previous non-global query request to the database for the specified user account (possibly distributed and synchronized across servers). A TDD is equivalent to an ADD with the data provided through a QUERY; hence the TDD takes place "after the fact." The database can also be cached on the client and synchronized based on location, time and other factor. A TDD is not of "global nature" and hence does not include location/altitude information.

If the input is a GADD request, the server enters into GADD state 4, labelled as 1108. The GADD state 1108 adds the user-specified movie, picture or other media content, and/or meta-information and location (GPS coordinate and/or altitude) to the global database (possibly distributed and synchronized across servers) or to a specified sub-database. The database can also be cached on the client and synchronized based on location, time and other factor. A GADD is of "global nature" and hence includes location/altitude information. Once GADD is completed, the application returns to the listening state.

If the input is a TADD request, the server enters into TADD state 5, labelled as 1110. The TADD state 1110 adds the movie, picture or other media content, and/or meta-information and location (GPS coordinate and/or altitude) specified in the previous global query request to the global database (possibly distributed and synchronized across servers) or to a specified sub-database. A TADD is equivalent to a GADD with the data provided through a GQUERY; hence, the TADD takes place "after the fact." The database can also be cached on the client and synchronized based on location, time and other factor. A TADD is of global nature and hence includes location/altitude information. Once TADD is completed, the application returns to the listening state.

If the input is a DIR request, the server enters into DIR state 6, labelled as 1112. The DIR state 1112 reviews the provided version number in the client. If the version number is older than in the server, the server submits an updated directory to the client (note that client and server could be on the same device. Other algorithms for determining whether a directory is updated can be used without loss of generality. The directory can be submitted in full or partially (e.g., only necessary updates) using any type of compression or encryption.

If the input is a QUERY request, the server enters into QUERY state 7, labelled as 1114. The QUERY state 1114 collects the incoming data (e.g., movie, picture or other media content, and/or meta-information) and uses it to look up appropriate matches in the database for the specified user account (can be of distributed nature). The system can also filter the meta-information and the media content picture type to select different algorithms to be applied to analyze such data (e.g., object-recognition, face-recognition, bar-code recognition, OCR, etc.). The system can also consider the state of other accounts and users as requested. For example, a search could be constrained by proximity to certain other users, considering their state. A possible application is the recognition of people. If one takes a picture of a real person at a certain location, it is very likely that one can only take pictures of the actual people physically present at the location. Hence, the system could automatically eliminate all persons not currently at the location in processing the query and focus on the view that is physically present.

If the input is a GQUERY request, the server enters into GQUERY state 8, labelled as 1116. GQUERY state 1116 can run a standard QUERY (State 7) in addition to the unique global query. The global query constrains the search via location information (GPS coordinates such as longitude, latitude and altitude). The global query searches the global database or a sub-database as specified. The use of 2D or 3D location information reduces the number of entries in the database that need to be considered. The system can also filter incoming data (e.g., location, altitude, the meta-information, media content type, media content itself, etc.) to select different algorithms to be applied to analyze such data (e.g., object-recognition, face-recognition, bar-code recognition, OCR, etc.). The system may also consider the state of other accounts and users as requested (e.g., to constrain the search by proximity to certain other people as described above).

As discussed above, there may be several recognition servers operating in a hierarchical manner. They conduct load-balancing, and screen and allocate requests accordingly (e.g., ADD/TDD may be based on user/account information, while GADD/TADD may be based on location/altitude information to a particular server/sub-system). Any other method/categorization for screening can be used without loss of generality. Each sub-system/individual server may be designed as one of the above variations of the server state machine. DIR requests could be rerouted to a separate set of servers, distributed among all servers, etc. Any load-balancing algorithm may be employed and load-balancing can be based on any meta-information, internal and external inputs, media content type and any other factors.

Figure 12:
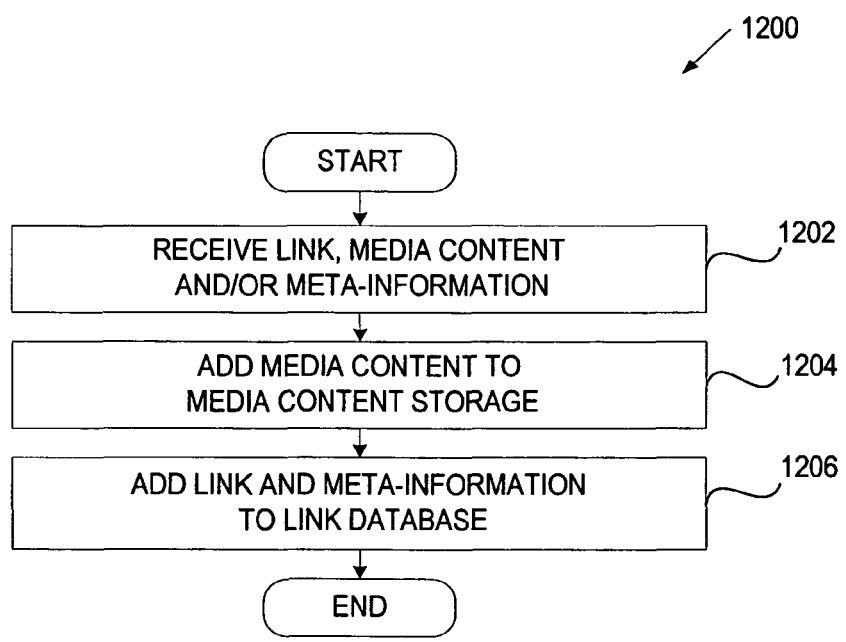
FIGS. 12 and 13 are flow diagrams of server-based methods performed according to some embodiments of the invention.
Figure 13:
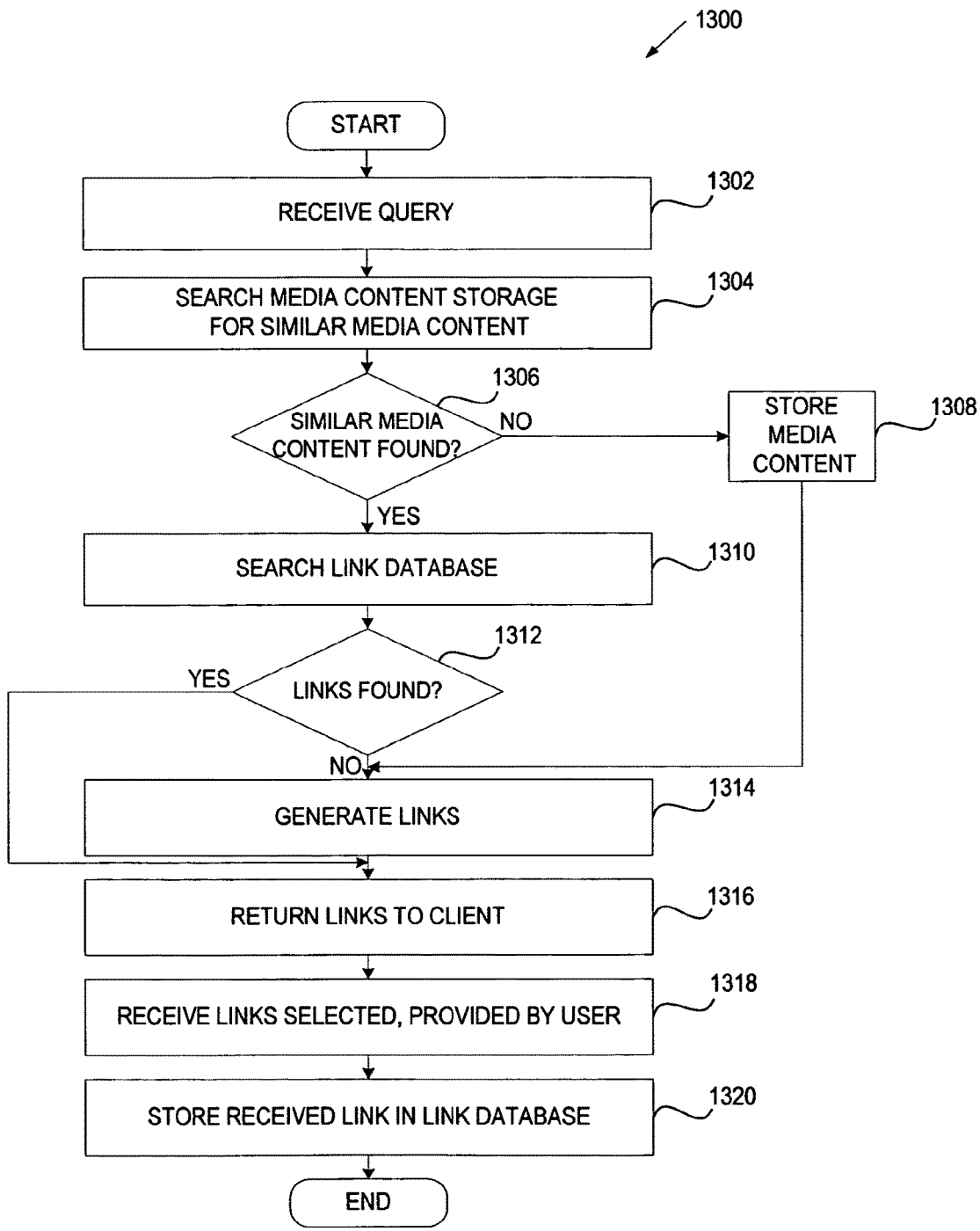

FIGS. 12 and 13 are flow diagrams of back-end methods performed according to some embodiments of the invention. The methods may be performed by processing logic that may comprise hardware (e.g., circuitry, dedicated logic, etc.), software (such as run on a general purpose computer system or a dedicated machine), or a combination of both. In one embodiment, processing logic resides in a back-end application 1400 discussed in more detail below in conjunction with FIG. 14.

FIG. 12 is a flow diagram of one embodiment of a method 1200 for populating a link database. Method 1200 begins with processing logic receiving a client request including a link and associated media content and/or meta-information (block 1202).

If the media content does not exist in the media content storage, processing logic adds the media content to the media content storage (block 1204). If the request is of a global nature, processing logic adds the media content to the global media content storage. If the request is not of a global nature, processing logic adds the media content to the media content storage for the specified user account.

At block 1206, processing logic adds the meta-information and the link to the link database. If the request is of a global nature, processing logic adds this data to the global link database. If the request is not of a global nature, processing logic adds the data to the link database for the specified user account. In one embodiment, processing logic automatically obtains additional meta-information (e.g., weather information if not provided by the client, traffic information for the location specified by the client, etc.) and stores this additional meta-information with the link in the link database.

In one embodiment, the creation and aggregation of links is performed for the database through internal efforts, end-users and partners. For example, the system can add pictures through company-internal efforts by employing wide-lens or panoramic cameras or vehicles equipped with such cameras to add imagery to the database. Another example is the usage of traditional mapping tools (without pictures) to provide a base-line of links. Locations can be linked to information, phone numbers, etc. solely based on geographic location. If a user takes a picture in a geographic area before any other user ever takes a picture there, she would at least receive the location-only-based results. The picture would then be used to refine the search results. Any future user taking a picture at the same location would benefit from the pictures taken there previously. Links created in this manner can be a useful first set of data that is readily available and can provide location-dependent information. So even if an object has not been added to the database, a user photographing an object can quickly access relevant information based on the current location.

One can also hire people to take pictures and assign links to photographs, especially in areas of high relevance, popularity, and interest. The system allows partners (potentially any organization that wants to provide visitors with greater access to rich information) that can add links to photographs of objects related to their organization. For example, a museum can add linked photos of artwork, a restaurant could link a digital version of their menu to a photo of its façade, and a movie theater could add a link to movie reviews and show times to a picture of the theater.

Finally, end-users can add links to photos of objects of interest to them. They can contribute to the database actively, by photographing objects and then assigning multiple links to the photos via their mobile or PC, or they can passively contribute to the database. Passive contribution means that anytime a user photographs an object while running the client application, the system server will try to identify links related to such photos/images that have been contributed to the public database. If no links have been assigned to an object, the application will present the user with some basic options based on the user's geographic location (maps, weather, etc) or the user can use the system's directory navigation to find a relevant link quickly. Anytime the user executes a link, that link will be assigned automatically to the object originally photographed. The next user to photograph that object will then be presented with the link selected by previous users. Links may not become overwritten, rather more and more links and pictures may be considered in the recognition process.

FIG. 13 is a flow diagram of one embodiment of a method 1300 for performing a search. Method 1300 begins with processing logic receiving a query request from the client (block 1302). The query request may include media content, and/or intermediate representations of media content, and/or meta-information for which desired links are sought.

At block 1304, processing logic searches the media content storage for similar media content. Depending on the type of media content, meta-information and/or the actual media content, processing logic may use different algorithms to analyze such content (e.g., object-recognition, face-recognition, bar-code recognition, OCR, etc.) to find the most similar content (even if it is not a close match). The similarity may or may not be based on a predefined threshold (to provide more flexibility). In one embodiment, if the query request is of a global nature, processing logic searches the global media content storage. If the query request is not of a global nature, processing logic searches the media content storage for the specified user account. In one embodiment, the search is constrained based meta-information, as discussed in more detail above.

In an alternative embodiment (not shown), the query request may only include meta-information (e.g., location or restaurant name) and/or intermediate representations of media content. Then, processing logic stores the link database for matching meta-information and/or intermediate representations. If any match is found, processing logic proceeds to block 1310. Alternatively, processing logic may not return any search results or may return an error message to the client.

At block 1306, processing logic determines whether similar content exists in the media content storage. If no similar content is found, in one embodiment, processing logic stores the media content in the media content storage and proceeds to block 1314. In another embodiment (not shown), processing logic does not store the content in the storage, and may not return any search results or may return an error message to the client.

If similar content is found, processing logic obtains an identifier of the similar media content and uses it to search the link databases (global or user-specific depending on the type of the query request) for matching links. If matching links are found, processing logic returns the found links to the client (block 1316). In on embodiment, processing logic constrains the search using relevant meta-information such time, date, season, weather, location, etc.

If matching links are not found, in one embodiment, processing logic proceeds to block 1314. At block 1314, processing logic generates links for the media content and/or meta-information using, for example, predefined logic and/or customizable rules, and returns the links to the client. In another embodiment, if matching links are not found (e.g., due to constraints based on meta-information), processing logic does not generate links but rather return no search results or an error message to the client.

At block 1318, processing logic receives a link selected by the user (e.g., executed via front end) or provided by the user (e.g., via the link directory or manual input) from the client. At block 1320, processing logic stores the link in the link database.

In one embodiment, processing logic also counts the number of times a certain link is activated and stores this information in a log (by user, group, etc.). Processing logic can later or in real time analyze this log for CRM, advertising pricing, and also for adjusting source results or giving entries priority over others.

In one embodiment, processing logic automatically generates categories by analyzing user patterns and frequency of use of certain links, etc. for the same media content.

In one embodiment, processing logic remembers which search result item was selected, and then associates the selected link with a new image, thereby improving the search quality for the next query. For example, if a user takes a picture of a New York Times newspaper stand in front of a supermarket, processing logic may only find links to information about the supermarket for this picture. These links are not what the user is looking for. So, the user may manually select New York Times out of the directory, and processing logic links the picture of the newspaper stand at that location with New York Times. The next time a user takes a picture of the newspaper stand in front of the supermarket, the user will get the New York Times link in the result list. With each selection of links, processing logic learns further. If the new user then selects New York Times from the results, processing logic will link the new picture taken also to New York Times, improving the recognition accuracy of the system.

Figure 14:
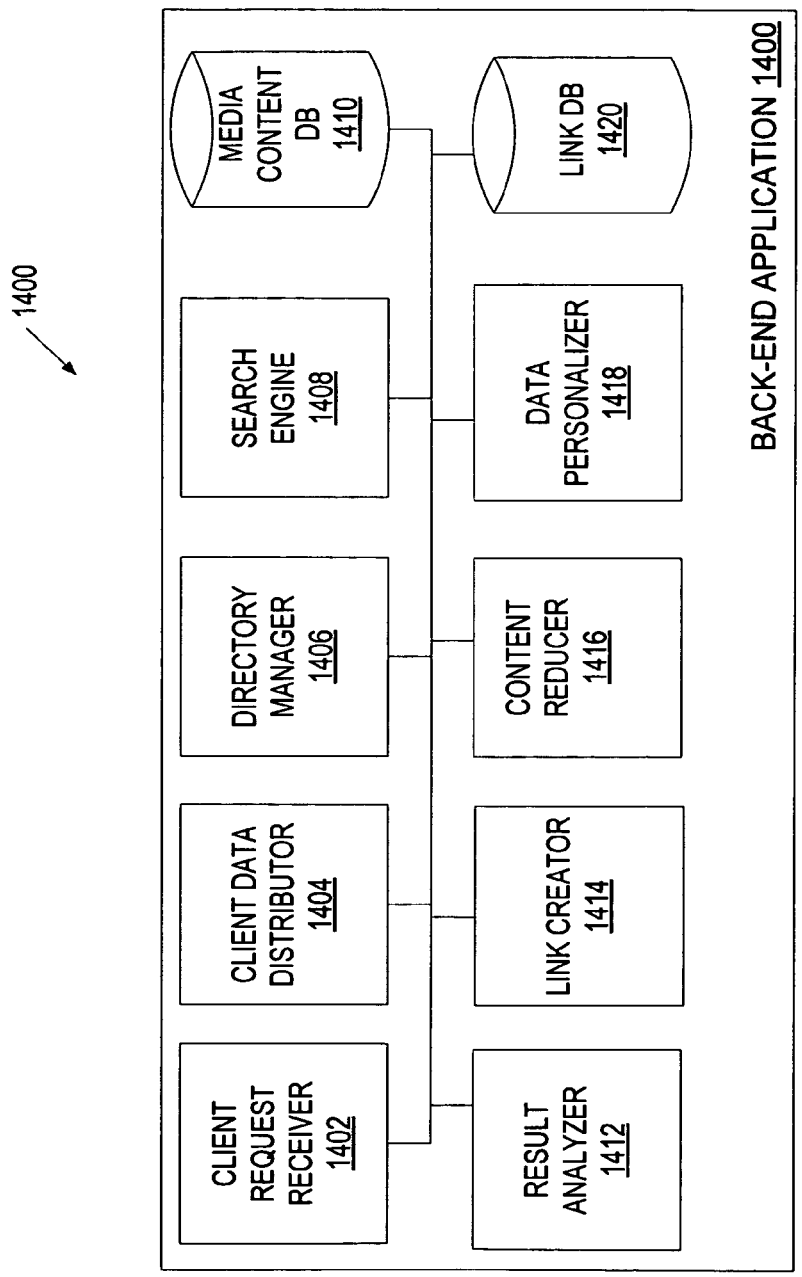
FIG. 14 is a block diagram of one embodiment of a back-end module.

FIG. 14 is a block diagram of one embodiment of a back-end module 1400. The back-end module 1400 may include a client request receiver 1402, a client data distributor 1401, a directory manager 1406, a search engine 1408, a media content storage 1410, a result analyzer 1412, a link creator 1414, a content reducer 1416, a data personalizer 1418, and a link database 1420.

The client request receiver 1402 is responsible for receiving requests from clients, determining their types and distributing these requests according to their type. The client data distributor 1404 is responsible for storing media content, meta-information and links received from the clients in appropriate data stores such as the media content storage 1410 (global or for a specific user) and the link database 1420 (global or for a specific user).

The directory manager 1406 is responsible for managing the directory of links and ensuring the client copies of the directory are in synch with the server directory.

The search engine 1408 is responsible for performing searches initiated by clients. As discussed above, searches involve looking for media content similar to that currently provided by the client. The search engine 1408 may employ various recognition algorithm depending on the type of media content. In one embodiment, the quick plug-in of new image algorithms is provided without users recognizing that a switch occurred. New algorithms can be added as well as old algorithms can be replaced as they improve or become redundant. In particular, the search engine 1408 may use object-recognition algorithms (optimized for specific objects or very general objects), text recognition/OCR, handwriting recognition, bar code recognition, face recognition, people recognition, symbol recognition, color recognition, shape recognition, motion recognition, gesture recognition, etc. The search engine 1408 can either automatically determine the best algorithm or set of algorithms to be used or can ask the user for additional input by providing selections or asking questions (e.g., "is this a person or a building?").

For people recognition or certain movable objects (e.g. watches, cloth, cars—things that people carry with them or move around with), the search engine 1408 may use the proximity of other devices. For example, if the search engine 1408 knows that certain users' devices are in proximity and others aren't, it could try to constrain the search to only those faces or people that match with the users in proximity. This type of search could be a first step before searching more people. However, this approach is likely to produce better results than not incorporating this knowledge of the proximity of other devices at all even if adoption of the system is still low. If the search results are not satisfactory, the user can lead the system to the right links by answering agent type questions or refine the search manually on the device.

The search engine 1408 can combine any number of recognition algorithms, including those that are independent of orientation. Bar code, text/OCR, drawing, color-based or any other algorithm can also be incorporated.

The result analyzer 1412 is responsible for analyzing user selections of links, as well as links provided by the users via the link directory and manual input, and utilizing this analysis to produce more accurate results for subsequent queries.

The link creator 1414 is responsible for creating new links. The link creator 1414 may create new links automatically (e.g., using predefined logic or customizable rules) or based on user input (e.g., via the link directory or manual entering).

The content reducer 1416 is responsible for reducing the content of the link database 1420 and the media content storage 1410. In particular, the content reducer 1416 automatically removes items that have not been selected in a long time to free up space, clean up the user interface, etc. In one embodiment, the content reducer 1416 also conducts cluster analysis on items (automatically or based on user input to see if certain items seem to be more relevant for certain user segments (e.g., sports fans vs. business travelers)). This knowledge in turn could help determine location for storage, caching (on servers or clients) and also possible times for deletion. For example, the cost of keeping an image can be traded off against the benefit of keeping an image by employing analytical models.

In one embodiment, detection algorithms are used to screen certain images that seem to be critical based on algorithm results. These images can then be reviewed by staff. Staff can look at images individually or one could have multiple staff look at the same images and statistically determine the best descriptions and which keywords, linked activities are (most frequent, $2^{nd}$ frequent, etc. among the staff-selected items for a particular image). For example, a skin detection algorithm (e.g. a maximum likelihood estimator or threshold based color histogram algorithm) can be used to detect pornographic content in order to block such content or handle it differently.

Media content can also be randomly selected for review by staff or designated algorithms. If one user seems to be especially risky, all media content created by this user can be reviewed. As a result, all his content can be deleted or his entire account can be blocked.

As searches are performed, the number of stored media content items, meta-information and links grows. In one embodiment, the content reducer 1416 imposes limits on data authored by users. For example, one could impose a maximum data amount limit per user, maximum data amount per user for a certain database (for example global), maximum number of links or maximum number of different titles, links or other tags, etc. Limits can be selective, e.g., only apply to a single user, a sub-set of users, or all users. As these limits are reached, different eviction and automatic compaction algorithms may be used to enforce these limits. In particular, based on the time from creation, the time from last use, or the frequency of use by the entire user-base, some segment of the user-base or a particular user (e.g., sets of links, individuals' links, images or other partial sets of data) can be evicted. Any caching scheme (e.g., FIFO, LIFO, LFU) could be applied in this context.

Further, if there exists many media content items for the same link, it may be possible to eliminate some of the media content items without hurting the overall accuracy of the system. For example, a certain percentage of pictures/movies with the same link at the same location or within the same region could be randomly chosen for deletion. One could also look at the images and eliminate links and pictures/movies with very redundant information (e.g., pictures from the same angle, under similar weather conditions, in same season or same time).

In one embodiment, the content reducer 1416 also clusters images with similar attributes (e.g., title, coloring, time, shape, location, weather, user, category, link type, rights or any other attribute). For example, instead of representing several results with the same link that result from different entries in the database, these entries can be collapsed automatically into fewer images/movies associated with such link. This clustering on the client device, as well as on a website or other portal can help to make pictures and videos more manageable to the user, easier to edit links after their creation, but also make search results easier to understand and easier to display even with small amount of screen real estate. This technique reduces the number of labels without impacting the recognition accuracy of the system, since the same number of pictures is still being considered. The different pictures with the same label (e.g., ten pictures from different angles of a trash can) can describe a range of possible variations of an object. This range can be considered by the image/object recognition algorithm employed.

The data personalizer 1418 incorporates dynamic personalization into the link priority/search results display. For example, if a user frequently chooses mapping links over other options, over time maps tend to move towards the top of the list for the user. If a user frequently seeks comparison pricing data, this type of link moves up with time.

Exemplary scenarios for utilizing embodiments of the invention will now be discussed. For example, users can quickly access and display maps on their phones using the service described herein. If a user's phone is locationenabled, the mapping service can orient the map around the user's physical location. From the mapping interface, users can have options to retrieve directions, traffic information, and can lay over additional data collected (local restaurants, shops, attractions etc.).

In another example, a museum patron can take a picture of a piece of artwork in a museum to retrieve audio/video/text lectures and historical information. They can also be linked to poster-ordering sites, postcard services or it can post to the user's mobile blog directly.

In yet another example, a diner can obtain menus, menu translations, restaurant reviews (either user-generated or published, e.g. Zagat, Citysearch), background information, nutritional data, and recipes for restaurants by taking a picture of the restaurant's façade, menu, or décor.

In still another example, companies can sponsor links for certain objects, symbols, brands, logos, buildings, photos or locations. When a user photographs a sponsored object, they will be presented with advertiser-chosen links such as: contest entries, maps to stores, video or audio commercials, company phone numbers, or general product information.

In yet another example, users can photograph objects, signs, vehicles, tickets or buildings related to transportation to access links to route maps, schedules, ticket purchasing, or other transportation information.

Other applications may include real-estate, military, music, gaming (e.g., augmented reality or virtual life games), people finder, dating, professional contacts, 3 degrees of separation at networking events, people recognition, education (e.g., platform for schools to link homework assignments to text books), text recognition (e.g., take a picture of a word and we will connect you to information about it), dynamic search algorithm personalization, mathematics (e.g., tools/calculations/developer tools), security applications, biometrics/human recognition/ID, payment and transaction system (e.g., set a "payment mode" where when a user hits the info retrieve button instead of returning links it automatically pays for the item using your credit card), artwork (e.g., data feeds into art displays), dynamic personalization artwork (e.g., when you walk by a big TV screen, your images are displayed on the screen and presented in artistic way (e.g., video, random appearing, rotating, floating, etc.)), government (e.g., nutrition information for food mandated by FDA, cigarette warning link mandated by FDA, FAA use for airline safety instructions, universal symbols posted around that automatically calls 911, police, etc.), entertainment (e.g. watching movies, remote control for devices, etc.), and many other applications.

In one embodiment, the system provides links to purchase advanced features. Such promotions may not only include the purchasing of equipment or external software, but also of internal software components or features (e.g., a sports package can provide more detailed links for sports or be bundled with automatic log-ons to certain premium websites). The system may also provide a new way to conduct business transactions. For example, one might take a picture of the object to buy, then the person or register to which to transfer money. The client would then ask the user whether the amount should be paid. The amount can be determined by the system understanding what object or service the user wants to be purchased, and the recipient can be determined by the system understanding who or what gets pointed at. The user could also first point on the recipient and then the object or any combination (e.g., both at once, or either way). The system could provide a secure exchange and transaction mechanism as well as a compliant backend billing system.

The system can also be used in the context of the publicly well-known concept of super-distribution. A user could take a picture of an object (e.g., a music CD) and automatically find the closest person (either in terms of degrees of separation via social networks or physical distance from home, from mobile device or other point of reference) that owns the linked piece of content (e.g. the CD's songs). The songs can then be provisioned to the user (e.g., on his mobile device, other device, home, work, etc.) and the user can be optionally billed. The gained revenue can be split among the originator of the content as well as any number of intermediaries on some pre-determined or dynamically determined revenue sharing schedule.

In one embodiment, the system that does not display non-user images to a user. In particular, all pictures/movies created by a certain user or within a certain user group may be locked from being viewed by others, while still making themselves usable as input to other people's searches. This approach makes it difficult to replicate the content of the database since not accessible to outsiders, but at the same time makes the database more beneficial to everyone as the database grows. This approach requires the appropriate rights management.

In an alternative embodiment, the system displays non-user images to other users to let them not only benefit in their search, but also in being able to view those pictures/movies. For example, sharing pictures with friends or submitting them to a photo studio for duplication could be an additional benefit that comes with using the system and could hence increase adoption. This approach requires the appropriate rights management and can be combined with above approach in a single system, providing the most flexibility.

Exemplary Computer System

Figure 15:
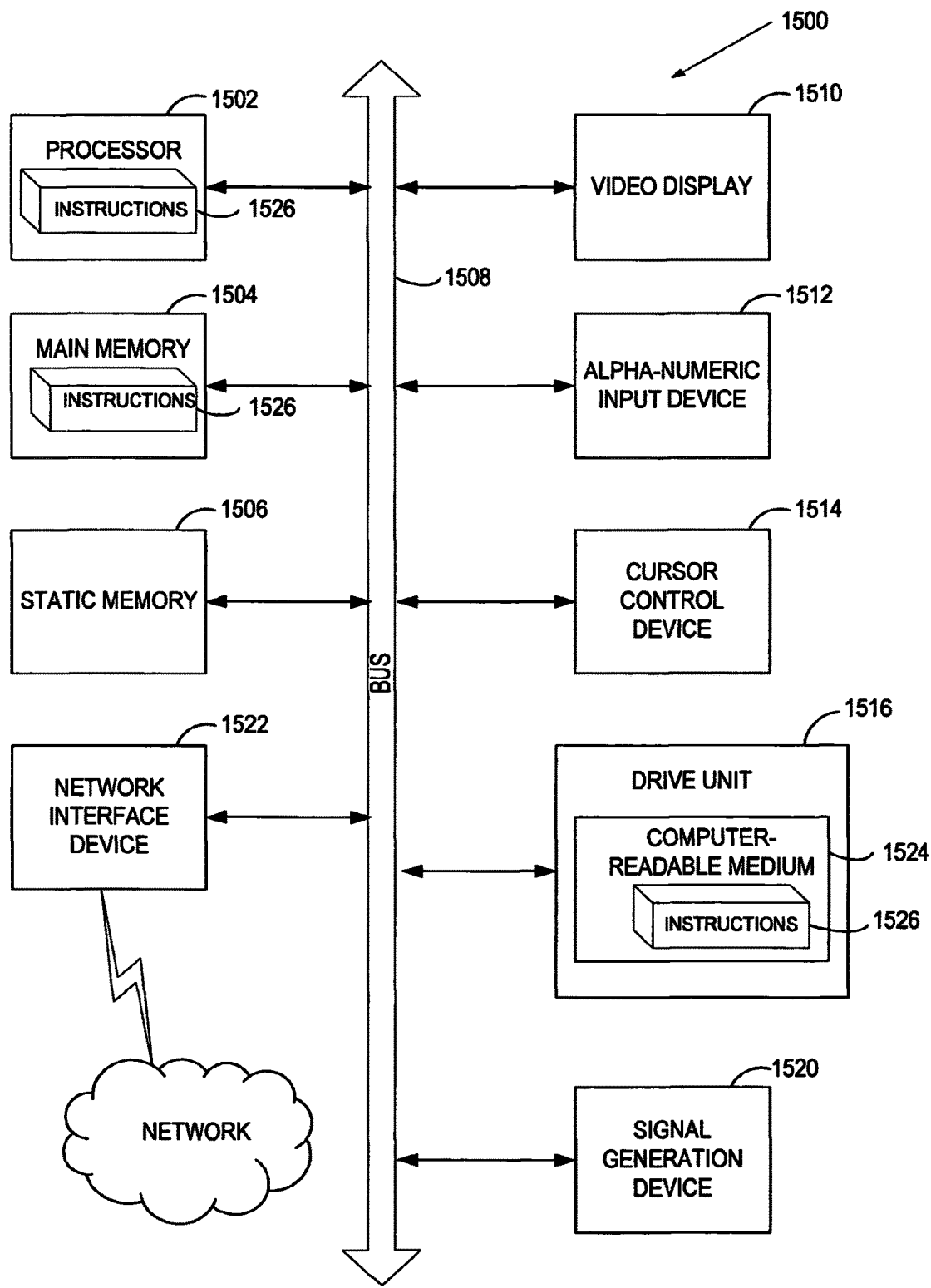
FIG. 15 is a block diagram of an exemplary computer system that may be used to perform one or more of the operations described herein.

FIG. 15 is a block diagram of an exemplary computer system 1500 (e.g., a client 102 or 116 or a server 104 or 114 of FIG. 1) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a cursor control device 1514 (e.g., a mouse), a disk drive unit 1516, a signal generation device 1520 (e.g., a speaker) and a network interface device 1522.

The disk drive unit 1516 includes a computer-readable medium 1524 on which is stored a set of instructions (i.e., software) 1526 embodying any one, or all, of the methodologies described above. The software 1526 is also shown to reside, completely or at least partially, within the main memory 1504 and/or within the processor 1502. The software 1526 may further be transmitted or received via the network interface device 1522. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
   receiving in real time at a mobile device an indication of information desired by a user once the mobile device is pointed to one or more objects in a real world by the user, wherein the indication of the desired information comprises live visual media content presenting the one or more objects therein, meta-information providing one or more properties of the media content, and one or more characteristics associated with at least one of the mobile device and the user;
   causing, at least in part, providing candidates for the desired information for presentation on the mobile device based, at least in part, on at least one of the live visual media content and the meta-information;
   determining a set of properties for the candidates;
   adjusting, based on the determined set of properties for the candidates, an access to the candidates for the information desired by the user; and
   creating one or more first links automatically based on the live visual media content, if no matching data is found in a database,
   wherein the candidates are concurrently presented with the live visual media content on one screen to the user for selection in real time without requiring the user to make any clicks from the time the user starts pointing the mobile device to the objects.

2. The method of claim 1, further comprising:
   searching the database for data matching the indication of the desired information for the candidates; and
   constraining a scope of a search based on at least one of the media content and the meta-information.

3. The method of claim 2, further comprising:
   identifying the one or more objects based upon one or more recognition parameters,
   wherein the search in the database for the candidates is further based upon one or more identified objects,
   if matching data is found in the database, each candidate is a second link that maps the one or more objects, the one or more characteristics, or a combination thereof to a desired information item, and
   the desired information item is a web site, a phone number, a message template, an application, an application state, a web page entry, a phone functionality, a keyword, a computer functionality, a document, a television program, a radio program, a music recording, or a combination thereof.

4. The method of claim 2, further comprising:
   associating each of the one or more first links with the live visual media content, the meta-information, or a combination thereof; and
   storing the one or more first links in the database.

5. The method of claim 2, further comprising:
   creating an intermediate representation of the media content, the intermediate representation being used to search the database for data matching the indication of the desired information,
   wherein the scope of the search is constrained by one or more other objects in the real world that are geographically near-by the one or more objects.

6. The method of claim 1, wherein:
   the candidates are overlaid on top of the live visual media content within a viewfinder of the mobile device; and
   the candidates are presented to the user without requiring the user to make any clicks to capture an image of the objects, from the time the user starts pointing the mobile device to the objects.

7. The method of claim 6, further comprising:
   in response to a subsequent search query of the user, searching within the stored association and the at least one of the media content and the meta-information to assemble the candidates as search results.

8. The method of claim 6, wherein:
   at least one candidate has a title that includes a preview of the desired information; and
   the method further comprises causing display of the title including the preview of the desired information when presenting the candidates to the user,
   wherein the displaying provides user access to the preview of the desired information when the user points the mobile device to one or more other objects.

9. The method of claim 1, further comprising:
   determining that the user has not selected a candidate;
   presenting a directory of information items to the user;
   allowing the user to select an information item from the directory;
   creating a link mapping the selected information item to the received indication of the desired information; and
   storing the link in the database.

10. The method of claim 1, further comprising selecting the candidates by searching a link database to identify one or more candidates associated with the indication of the desired information and generating the one or more candidates based upon one or more predefined rules.

11. The method of claim 1, further comprising:
    causing, at least in part, reception of an indication of a selection of the user in response to the providing of the candidates;
    creating an association between the selection of the user and the indication of information desired by the user; and
    causing, at least in part, storage of the association and at least one of the media content and the meta-information,
    wherein the media content is produced by the mobile device and comprises one or more digital photographs, one or more videos, one or more audio recordings, or a combination thereof, and
    the meta-information comprises one or more characteristics of the media content, one or more environmental characteristics associated with the mobile device, one or more geographic characteristics associated with the mobile device, one or more personal characteristics associated with the user, one or more online behavior characteristics of the user, or a combination thereof.

12. The method of claim 1, further comprising:
    causing, at least in part, starting of a timer when the mobile device is pointed to one or more objects in a real world by the user; and causing, at least in part, providing the candidates for the desired information based on regular or irregular intervals based on the timer.

13. An apparatus comprising:
at least one processor; and at least one memory including computer program code,
the at least one memory and the computer program code configured to, with the at least one processor, cause the apparatus to perform at least the following,
receive in real time at a mobile device an indication of information desired by a user once the mobile device is pointed to one or more objects in a real world by the user, wherein the indication of the desired information comprises live visual media content presenting the one or more objects therein, meta-information providing one or more properties of the media content, and one or more characteristics associated with at least one of the mobile device and the user;
cause, at least in part, providing candidates for the desired information for presentation on the mobile device based, at least in part, on at least one of the live visual media content and the meta-information;
determine a set of properties for the candidates;
adjust, based on the determined set of properties for the candidates, an access to the candidates for the information desired by the user; and
create one or more links automatically based on the live visual media content, if no matching data is found in a database,
wherein the candidates are concurrently presented with the live visual media content on one screen to the user for selection in real time without requiring the user to make any clicks from the time the user starts pointing the mobile device to the objects.

14. The apparatus of claim 13, wherein the apparatus is further caused to select the candidates by searching a link database to identify one or more candidates associated with the indication of the desired information and generate the one or more candidates based upon one or more predefined rules.

15. The apparatus of claim 13, wherein the apparatus is further caused to:
receive an indication of a selection of the user in response to the providing of the candidates;
create an association between the selection of the user and the indication of information desired by the user; and
store the association and at least one of the media content and the meta-information,
wherein the media content is produced by the mobile device and comprises one or more digital photographs, one or more videos, one or more audio recordings, or a combination thereof, and
the meta-information comprises one or more characteristics of the media content, one or more environmental characteristics associated with the mobile device, one or more geographic characteristics associated with the mobile device, one or more personal characteristics associated with the user, one or more online behavior characteristics of the user, or a combination thereof.

16. The apparatus of claim 13, wherein the apparatus is further caused to:
cause, at least in part, starting of a timer when the mobile device is pointed to one or more objects in a real world by the user; and
cause, at least in part, providing the candidates for the desired information based on regular or irregular intervals based on the timer.

17. A non-transitory computer-readable storage medium carrying one or more sequences of one or more instructions which, when executed by one or more processors, cause an apparatus to at least perform the following steps:
receiving in real time at a mobile device an indication of information desired by a user once the mobile device is pointed to one or more objects in a real world by the user, wherein the indication of the desired information comprises live visual media content presenting the one or more objects therein, meta-information providing one or more properties of the media content, and one or more characteristics associated with at least one of the mobile device and the user;
causing, at least in part, providing candidates for the desired information for presentation on the mobile device based, at least in part, on at least one of the live visual media content and the meta-information;
determining a set of properties for the candidates;
adjusting, based on the determined set of properties for the candidates, an access to the candidates for the information desired by the user; and
creating one or more links automatically based on the live visual media content, if no matching data is found in a database,
wherein the candidates are concurrently presented with the live visual media content on one screen to the user for selection in real time without requiring the user to make any clicks from the time the user starts pointing the mobile device to the objects.

18. The non-transitory computer-readable storage medium of claim 17, wherein the apparatus is further cause to perform selecting the candidates by searching a link database to identify one or more candidates associated with the indication of the desired information and generate the one or more candidates based upon one or more predefined rules.

19. The non-transitory computer-readable storage medium of claim 17, wherein the apparatus is further cause to perform:
receiving an indication of a selection of the user in response to the providing of the candidates;
creating an association between the selection of the user and the indication of information desired by the user; and
storing the association and at least one of the media content and the meta-information;
wherein the media content is produced by the mobile device and comprises one or more digital photographs, one or more videos, one or more audio recordings, or a combination thereof, and
the meta-information comprises one or more characteristics of the media content, one or more environmental characteristics associated with the mobile device, one or more geographic characteristics associated with the mobile device, one or more personal characteristics associated with the user, one or more online behavior characteristics of the user, or a combination thereof.

20. The non-transitory computer-readable storage medium of claim 17, wherein the apparatus is further cause to perform:
causing, at least in part, starting of a timer when the mobile device is pointed to one or more objects in a real world by the user; and
causing, at least in part, providing the candidates for the desired information based on regular or irregular intervals based on the timer.

* * * * *